United States Patent
Cao et al.

(10) Patent No.: US 12,490,142 B2
(45) Date of Patent: Dec. 2, 2025

(54) SERVICE TRAFFIC STEERING METHOD AND APPARATUS

(71) Applicant: HUAWEI TECHNOLOGIES CO., LTD., Guangdong (CN)

(72) Inventors: Longyu Cao, Shanghai (CN); Dongrun Qin, Shenzhen (CN); Yijun Yu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 18/167,187

(22) Filed: Feb. 10, 2023

(65) Prior Publication Data
US 2023/0189057 A1 Jun. 15, 2023

Related U.S. Application Data

(63) Continuation of application No. PCT/CN2021/111070, filed on Aug. 6, 2021.

(30) Foreign Application Priority Data

Aug. 14, 2020 (CN) .......................... 202010819932.4

(51) Int. Cl.
*H04W 28/02* (2009.01)
*H04W 28/10* (2009.01)

(52) U.S. Cl.
CPC ....... *H04W 28/0268* (2013.01); *H04W 28/10* (2013.01)

(58) Field of Classification Search
CPC ............. H04W 28/0268; H04W 28/10; H04W 28/0861; H04W 28/0925; H04W 28/0942; H04W 28/0967; H04W 28/24
See application file for complete search history.

(56) References Cited

U.S. PATENT DOCUMENTS

2016/0135104 A1* 5/2016 Lau .................... H04W 36/304
455/436

FOREIGN PATENT DOCUMENTS

| CN | 105897375 A | 8/2016 |
|---|---|---|
| CN | 108616958 A | 10/2018 |

(Continued)

OTHER PUBLICATIONS

Huawei, HiSilicon, ATSSS Rule definition and update of TFCP. SA WG2 Meeting #127, Apr. 16, 20, 2018, Sanya, China, S2-183361, 12 pages.

(Continued)

*Primary Examiner* — Khoa Huynh

(57) ABSTRACT

The present disclosure provides a service traffic steering method and an apparatus, to improve user experience. The method includes: A first network device determines at least one second terminal device, where first quality of experience corresponding to a first service flow of the at least one second terminal device does not meet target quality of experience corresponding to the first service flow of the at least one second terminal device. The first network device determines a target radio access network device, where the target radio access network device meets the target quality of experience corresponding to the first service flow of the at least one second terminal device. The first network device connects the first service flow of the at least one second terminal device to the target radio access network device.

20 Claims, 13 Drawing Sheets

(56) References Cited

FOREIGN PATENT DOCUMENTS

| | | |
|---|---|---|
| CN | 109479215 A | 3/2019 |
| CN | 110677925 A | 1/2020 |
| WO | 2020155172 A1 | 8/2020 |

OTHER PUBLICATIONS

Extended European Search Report issued in EP21855446.7, dated Jan. 4, 2024, 11 pages.

* cited by examiner

300

```
┌─────────────────────────────────────────────────────────────┐
│ A first network device obtains first quality of experience  │
│ corresponding to a first service flow of at least one       │──── 310
│ first terminal device                                       │
└─────────────────────────────────────────────────────────────┘
                              │
┌─────────────────────────────────────────────────────────────┐
│ The first network device determines at least one second     │
│ terminal device in the at least one first terminal device   │
│ based on the first quality of experience, where first       │
│ quality of experience corresponding to a first service flow │──── 320
│ of the second terminal device does not meet target quality  │
│ of experience corresponding to the first service flow of    │
│ the second terminal device                                  │
└─────────────────────────────────────────────────────────────┘
                              │
┌─────────────────────────────────────────────────────────────┐
│ The first network device determines a target radio access   │
│ network device, where the target radio access network       │
│ device meets the target quality of experience corresponding │──── 330
│ to the first service flow of the at least one second        │
│ terminal device                                             │
└─────────────────────────────────────────────────────────────┘
                              │
┌─────────────────────────────────────────────────────────────┐
│ The first network device connects the first service flow    │
│ of the at least one second terminal device to the target    │──── 340
│ radio access network device                                 │
└─────────────────────────────────────────────────────────────┘
```

A first radio access intelligent controller sends a second request message to a second radio access intelligent controller through an R1 interface, where the second request message is used to obtain second performance data information that corresponds to a first service flow and that is obtained by at least one second terminal device from a second radio access network device — 810

The second radio access intelligent controller sends the second request message to the second radio access network device through an R2 interface — 820

The second radio access network device collects the second performance data information that corresponds to the first service flow and that can be obtained by the second terminal device, and sends the second performance data information to the second radio access intelligent controller by using an R2 indication message — 830

The second radio access intelligent controller sends the second performance data information to the first radio access intelligent controller through the R1 interface — 840

FIG. 8

SERVICE TRAFFIC STEERING METHOD AND APPARATUS

CROSS-REFERENCE TO RELATED APPLICATIONS

This application is a continuation of International Patent Application No. PCT/CN2021/111070, filed on Aug. 6, 2021, which claims priority to Chinese Patent Application No. 202010819932.4, filed on Aug. 14, 2020. The disclosures of the aforementioned applications are hereby incorporated by reference in their entireties.

TECHNICAL FIELD

The present disclosure relates to the communication field, and more specifically, to a service traffic steering method and an apparatus.

BACKGROUND

In the 5th generation (5G) network era, a network can support more abundant service types and application scenarios, such as cloud virtual reality (Cloud VR), unmanned aerial vehicle, and 8K live video. These different types of services have greatly different requirements on network performance. For example, the cloud VR has high requirements on a network delay and bandwidth, and the 8K live video has high requirements on a network delay, bandwidth, and a packet loss rate.

For a terminal device, the terminal device may be interested in a plurality of types of services at the same time. When service quality of experience (QoE) corresponding to a specific service type of the terminal device meets a requirement, QoE of another service of the terminal device may not meet a requirement. Currently, if QoE corresponding to a specific service type of the terminal device does not meet a requirement, the terminal device is handed over from an original serving radio access network device to a target radio access network device that can meet the requirement of the QoE corresponding to the service type. However, when the terminal device simultaneously performs a plurality of types of services, because QoE of these services differs greatly, it is difficult to find a target radio access network device that can meet the QoE corresponding to all the services to support handover of the terminal device.

SUMMARY

The present disclosure provides a service traffic steering method and an apparatus, to improve user experience.

According to a first aspect, a service traffic steering method is provided. The method includes: A first network device obtains first quality of experience corresponding to a first service flow of at least one first terminal device. The first network device determines at least one second terminal device in the at least one first terminal device based on the first quality of experience, where first quality of experience corresponding to a first service flow of the second terminal device does not meet target quality of experience corresponding to the first service flow of the second terminal device. The first network device determines a target radio access network device, where the target radio access network device meets the target quality of experience corresponding to the first service flow of the at least one second terminal device. The first network device connects the first service flow of the at least one second terminal device to the target radio access network device.

Based on the foregoing technical solution, when a currently accessed first radio access network device does not meet the target quality of experience or target performance corresponding to the first service flow of the second terminal device, only the first service flow of the second terminal device may be connected to the target radio access network device that can meet the target quality of experience of the first service flow of the second terminal device, and there is no need to hand over the second terminal device to the target radio access network device. In this way, the second terminal device can be connected to a plurality of radio access network devices at the same time, so that communication requirements of different service types are ensured, and user experience is improved.

In a possible implementation, that a first network device obtains first quality of experience corresponding to a first service flow of at least one first terminal device includes: The first network device sends a first request message to the first radio access network device, where the first request message is used to subscribe to first performance data information corresponding to the first service flow of the at least one first terminal device, and the first request message includes an identifier of the at least one first terminal device and a first identifier corresponding to the first service flow. The first network device receives a first response message sent by the first radio access network device, where the first response message includes the first performance data information. The first network device determines the first quality of experience based on the first performance data information.

In a possible implementation, that the first network device determines at least one target radio access network device includes: The first network device sends a second request message to the first radio access network device, where the second request message is used to obtain a plurality of pieces of second performance data information that correspond to the first service flow and that are obtained by the at least one second terminal device from a plurality of second radio access network devices, and the second request message includes an identifier of the at least one second terminal device and a first identifier. The first network device receives a second response message sent by the first radio access network device, where the second response message includes the plurality of pieces of second performance data information. The first network device determines, based on the plurality of pieces of second performance data information, a plurality of pieces of second quality of experience corresponding to the first service flow of the at least one second terminal device. The first network device determines the target radio access network device based on the plurality of pieces of second quality of experience, where second quality of experience that corresponds to the first service flow and that is obtained by the at least one second terminal device from the target radio access network device meets the target quality of experience.

In a possible implementation, that the first network device connects the first service flow of the at least one second terminal device to the target radio access network device includes: The first network device sends traffic steering indication information to the first radio access network device, to enable the first radio access network device to connect the first service flow of the at least one second terminal device to the target radio access network device.

In a possible implementation, the traffic steering indication information includes the identifier of the second terminal device, the first identifier, an identifier of the target radio access network device, and dual connectivity indication information, the dual connectivity indication information indicates to connect the first service flow of the second terminal device to the target radio access network device, and the second terminal device establishes connections to at least two radio access network devices.

In a possible implementation, before that the first network device connects the first service flow of the at least one second terminal device to the target radio access network device, the method further includes: The first network device determines that the at least one second terminal device supports dual connectivity.

In a possible implementation, that the first network device determines that the at least one second terminal device supports dual connectivity includes: The first network device sends a third request message to the first radio access network device, where the third request message is used to subscribe to capability information indicating whether the at least one second terminal device supports dual connectivity, and the third request message includes the identifier of the at least one second terminal device. The first network device receives a third response message sent by the first radio access network device, where the third response message includes the capability information indicating whether the at least one second terminal device supports dual connectivity. The first network device determines, based on the capability information, that the at least one second terminal device supports dual connectivity.

In a possible implementation, before that a first network device obtains first quality of experience corresponding to a first service flow of at least one first terminal device, the method further includes: The first network device determines, based on the first service flow, the first identifier corresponding to the first service flow, where the first identifier is used by the first radio access network device to identify the first service flow.

In a possible implementation, before that the first network device determines, based on the first service flow, the first identifier corresponding to the first service flow, the method further includes: The first network device receives a fourth message sent by a second network device, where the fourth message includes steering policy information corresponding to the first service flow, and the steering policy information includes the target quality of experience.

In a possible implementation, the method further includes: The first network device sends dual connectivity release indication information to the first radio access network device, where the dual connectivity release indication information indicates the first radio access network device to release a connection between the second terminal device and the target radio access network device after service data transmission corresponding to the first service flow is completed, and the dual connectivity release indication information includes the identifier of the second terminal device.

After the data transmission corresponding to the first service flow of the second terminal device ends, the connection between the second terminal device and the target radio access network device is released in time, so that radio resources can be effectively used.

In a possible implementation, the method further includes: The first network device sends a fourth request message to the first radio access network device, where the fourth request message indicates the first radio access network device to send a service data transmission complete message after service data transmission corresponding to the first service flow is completed, the fourth request message includes the identifier of the at least one second terminal device and the first identifier, and the service data transmission complete message includes the identifier of the at least one second terminal device and the first identifier. The first network device receives the service data transmission complete message sent by the first radio access network device. The first network device determines, based on the service data transmission complete message, whether to release a connection between the second terminal device and the target radio access network device.

In a possible implementation, that the first network device determines, based on the service data transmission complete message, whether to release a connection between the second terminal device and the target radio access network device includes: If the first network device determines, based on the service data transmission complete message, to release the connection between the second terminal device and the target radio access network device, the first network device sends dual connectivity release indication information to the first radio access network device, where the dual connectivity release indication information includes the identifier of the second terminal device. If the first network device determines, based on the service data transmission complete message, not to release the connection between the second terminal device and the target radio access network device, the first network device sends dual connectivity update indication information to the first radio access network device, where the dual connectivity update indication information indicates to connect a service flow of a second service type of the second terminal device to the target radio access network device, and the dual connectivity update indication information includes dual connectivity modification configuration information.

In a possible implementation, the first network device is a radio access intelligent controller, and the second network device is a radio access management controller.

According to a second aspect, a communication apparatus is provided. The apparatus includes: a transceiver unit, configured to obtain first quality of experience corresponding to a first service flow of at least one first terminal device: a determining unit, configured to determine at least one second terminal device in the at least one first terminal device based on the first quality of experience, where first quality of experience corresponding to a first service flow of the second terminal device does not meet target quality of experience corresponding to the first service flow of the second terminal device, where the determining unit is further configured to determine a target radio access network device, where the target radio access network device meets the target quality of experience corresponding to the first service flow of the at least one second terminal device; and a processing unit, configured to connect the first service flow of the at least one second terminal device to the target radio access network device.

In a possible implementation, the transceiver unit is further configured to send a first request message to a first radio access network device, where the first request message is used to subscribe to first performance data information corresponding to the first service flow of the at least one first terminal device, and the first request message includes an identifier of the at least one first terminal device and a first identifier corresponding to the first service flow. The transceiver unit is further configured to receive a first response message sent by the first radio access network device, where the first response message includes the first performance data information. The determining unit is specifically configured to determine the first quality of experience based on the first performance data information.

In a possible implementation, the transceiver unit is further configured to send a second request message to the first radio access network device, where the second request message is used to obtain a plurality of pieces of second performance data information that correspond to the first service flow and that are obtained by the at least one second terminal device from a plurality of second radio access network devices, and the second request message includes an identifier of the at least one second terminal device and a first identifier. The transceiver unit is further configured to receive a second response message sent by the first radio access network device, where the second response message includes the plurality of pieces of second performance data information. The determining unit is specifically configured to determine, based on the plurality of pieces of second performance data information, a plurality of pieces of second quality of experience corresponding to the first service flow of the at least one second terminal device. The determining unit is further specifically configured to determine the target radio access network device based on the plurality of pieces of second quality of experience, where second quality of experience that corresponds to the first service flow and that is obtained by the at least one second terminal device from the target radio access network device meets the target quality of experience.

In a possible implementation, the processing unit is specifically configured to enable the transceiver unit to send traffic steering indication information to the first radio access network device, to enable the first radio access network device to connect the first service flow of the at least one second terminal device to the target radio access network device.

In a possible implementation, the traffic steering indication information includes the identifier of the second terminal device, the first identifier, an identifier of the target radio access network device, and dual connectivity indication information, the dual connectivity indication information indicates to connect the first service flow of the second terminal device to the target radio access network device, and the second terminal device establishes connections to at least two radio access network devices.

In a possible implementation, before the transceiver unit sends the traffic steering indication information to the first radio access network device, the determining unit is further configured to: determine that the at least one second terminal device supports dual connectivity.

In a possible implementation, the transceiver unit is further configured to send a third request message to the first radio access network device, where the third request message is used to subscribe to capability information indicating whether the at least one second terminal device supports dual connectivity, and the third request message includes the identifier of the at least one second terminal device. The transceiver unit is further configured to receive a third response message sent by the first radio access network device, where the third response message includes the capability information indicating whether the at least one second terminal device supports dual connectivity. The determining unit is specifically configured to determine, based on the capability information, that the at least one second terminal device supports dual connectivity.

In a possible implementation, before the transceiver unit obtains the first quality of experience corresponding to the first service flow of the at least one first terminal device, the determining unit is further configured to: determine, based on the first service flow, the first identifier corresponding to the first service flow, where the first identifier is used by the first radio access network device to identify the first service flow.

In a possible implementation, the transceiver unit is further configured to receive a fourth message sent by a second network device, where the fourth message includes steering policy information corresponding to the first service flow, and the steering policy information includes the target quality of experience.

In a possible implementation, the transceiver unit is further configured to send dual connectivity release indication information to the first radio access network device, where the dual connectivity release indication information indicates the first radio access network device to release a connection between the second terminal device and the target radio access network device after service data transmission corresponding to the first service flow is completed, and the dual connectivity release indication information includes the identifier of the second terminal device. After the data transmission corresponding to the first service flow of the second terminal device ends, the connection between the second terminal device and the target radio access network device is released in time, so that radio resources can be effectively used.

In a possible implementation, the transceiver unit is further configured to send a fourth request message to the first radio access network device, where the fourth request message indicates the first radio access network device to send a service data transmission complete message after service data transmission corresponding to the first service flow is completed, the fourth request message includes the identifier of the at least one second terminal device and the first identifier, and the service data transmission complete message includes the identifier of the at least one second terminal device and the first identifier. The transceiver unit is further configured to receive the service data transmission complete message sent by the first radio access network device. The determining unit is further configured to determine, based on the service data transmission complete message, whether to release a connection between the second terminal device and the target radio access network device.

In a possible implementation, if the determining unit determines, based on the service data transmission complete message, to release the connection between the second terminal device and the target radio access network device, the transceiver unit is further configured to send dual connectivity release indication information to the first radio access network device, where the dual connectivity release indication information includes the identifier of the second terminal device. If the determining unit determines, based on the service data transmission complete message, not to release the connection between the second terminal device and the target radio access network device, the transceiver unit is further configured to send dual connectivity update indication information to the first radio access network device, where the dual connectivity update indication information indicates to connect a service flow of a second service type of the second terminal device to the target radio access network device, and the dual connectivity update indication information includes dual connectivity modification configuration information.

In a possible implementation, the second network device is a radio access management controller.

According to a third aspect, a communication device is provided. The device includes a processor and a transceiver.

The transceiver is configured to: receive computer code or instructions, and transmit the computer code or the instructions to the processor. The processor runs the computer code or the instructions, to implement the method according to any one of the first aspect or the possible implementations of the first aspect.

According to a fourth aspect, a communication system is provided. The system includes the first network device, the second network device, the first terminal device, the second terminal device, the first radio access network device, and the target radio access network device in the method according to the first aspect.

According to a fifth aspect, a computer-readable storage medium is provided. The computer-readable medium stores a computer program. When the computer program is run on a computer, the computer is enabled to perform the method according to any one of the first aspect or the possible implementations of the first aspect.

BRIEF DESCRIPTION OF DRAWINGS

FIG. 3 is a schematic flowchart of a service traffic steering method according to an embodiment of the present disclosure;

FIG. 8 is a schematic flowchart of a method for determining a target radio access network device according to an embodiment of the present disclosure:

DETAILED DESCRIPTION OF EMBODIMENTS

The following describes technical solutions of the present disclosure with reference to accompanying drawings.

Embodiments of the present disclosure may be applied to various communication systems, for example, a wireless local area network (WLAN) system, a narrowband internet of things (NB-IoT) system, a global system for mobile communications (GSM), an enhanced data rate for GSM evolution (EDGE) system, a wideband code division multiple access (WCDMA) system, a code division multiple access 2000 (CDMA 2000) system, a time division-synchronous code division multiple access (TD-SCDMA) system, a long term evolution (LTE) system, a satellite communication system, a 5th generation (5G) system, and a new communication system emerging in the future.

A terminal device in embodiments of the present disclosure may include various handheld devices, vehicle-mounted devices, wearable devices, or computing devices that have a wireless communication function, or other processing devices connected to a wireless modem. The terminal may be a mobile station (MS), a subscriber unit, user equipment (UE), a cellular phone, a smartphone, a wireless data card, a personal digital assistant (PDA) computer, a tablet computer, a wireless modem, a handheld device, a laptop computer, a machine type communication (MTC) terminal, or the like.

With development of wireless network technologies, automation and intelligentization have been considered as one of the important directions of wireless network development in the future. The industry has done many research and explorations on intelligentization of wireless networks.

Figure 1:
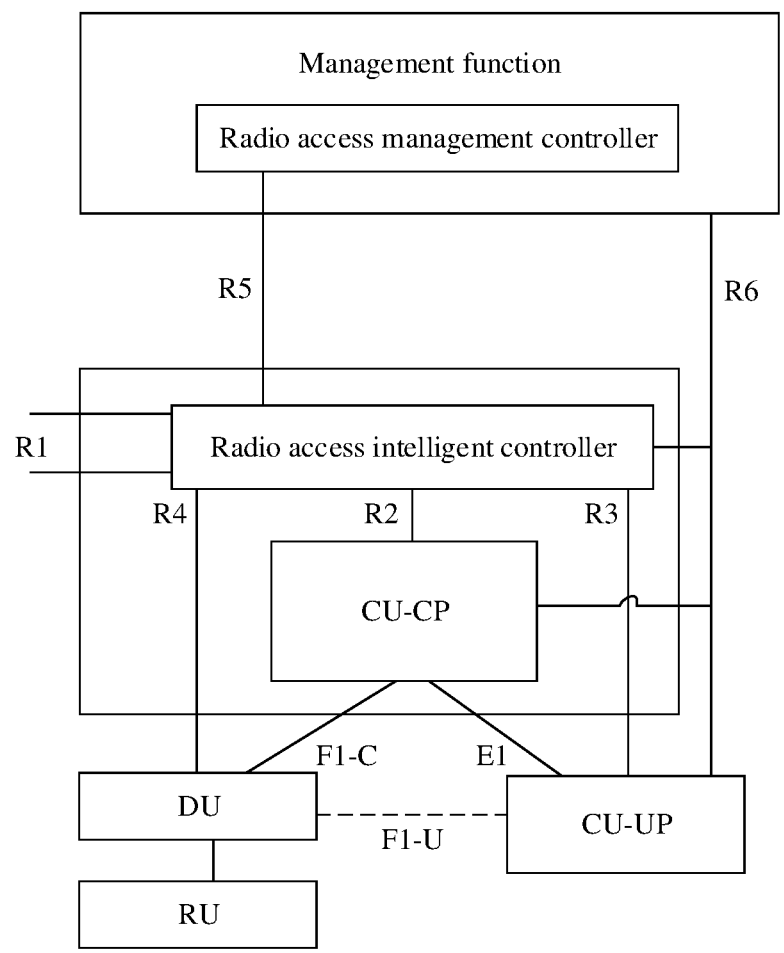
FIG. 1 is a schematic diagram of a network architecture of a new RAN according to an embodiment of the present disclosure.

A new radio access network (RAN) is obtained by reconstructing a radio access network (RAN) based on technologies such as artificial intelligence (AI) or machine learning (ML). FIG. 1 is a schematic diagram of a network architecture of the new RAN. The architecture of the new RAN includes the following functional modules: an operation, administration and maintenance (OAM), a radio access management controller, a radio access intelligent controller, a central unit-control plane (CU-CP), a central unit-user plane (CU-UP), a distributed unit (DU), and a radio access network unit (RAN unit, RU). The radio access intelligent controller, the CU-CP, the CU-UP, the DU, and the RU provide service functions of a control plane and a user plane of a wireless network. The radio access management controller and the OAM provide service functions of a management plane. The radio access intelligent controller further supports management of an LTE network element, for example, an open base station (eNB).

Functions of main functional modules defined in the new RAN are described as follows:

Radio access management controller: controls and optimizes delay-insensitive services of O-RAN functional network elements and resources, executes AI/ML workflows including model training and update, and manages applications/features based on policies.

Radio access intelligent controller: controls and optimizes RAN functional network elements such as the CU-CP and resources based on data collection and operation instructions over R2/R3/R4 interfaces.

CU-CP: is a central unit-control plane of the new RAN, and implements RRC protocol functions and packet data convergence protocol (PDCP) protocol control plane functions.

CU-UP: is a central unit-user plane of the new RAN, and implements PDCP protocol user plane functions and service data adaptation protocol (SDAP) protocol functions.

DU: is a distributed unit of the new RAN, and implements radio link control (RLC)/media access control (MAC)/high physical layer (High-PHY) protocol functions.

RU: is a radio unit of the new RAN, and implements low physical layer (low-PHY) protocol functions and a low-layer split radio frequency (RF) processing function.

OAM: provides operation and maintenance management for functional modules of the new RAN.

A core objective of the architecture of the new RAN is to implement automation and intelligentization management of wireless network resources through an AI/ML model of the radio access intelligent controller/radio access management controller, to further improve network flexibility and resource efficiency and provide better service experience for users.

Figure 2A:
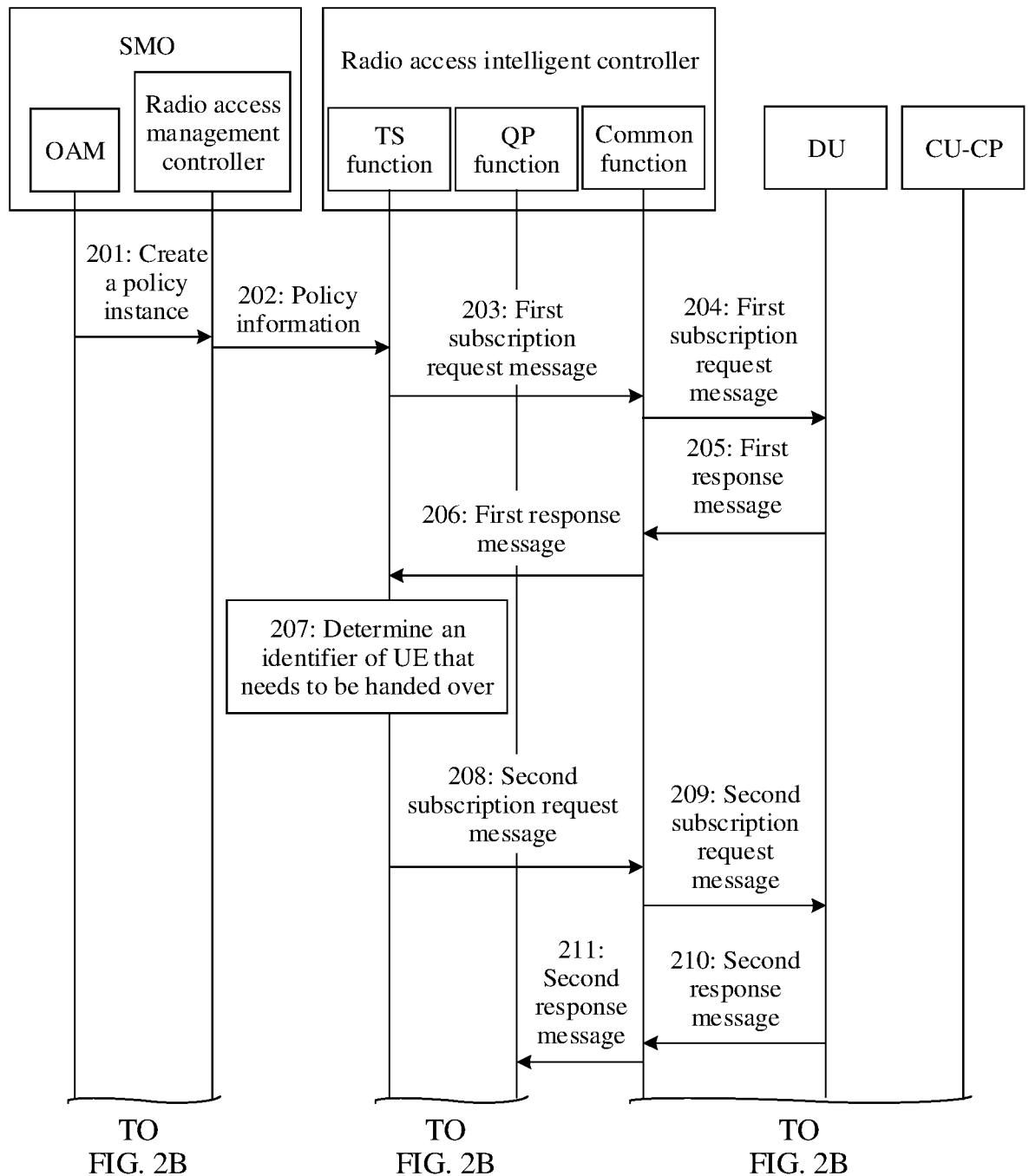
FIG. 2A and FIG. 2B are a schematic interaction flowchart of a traffic steering method.
Figure 2B:
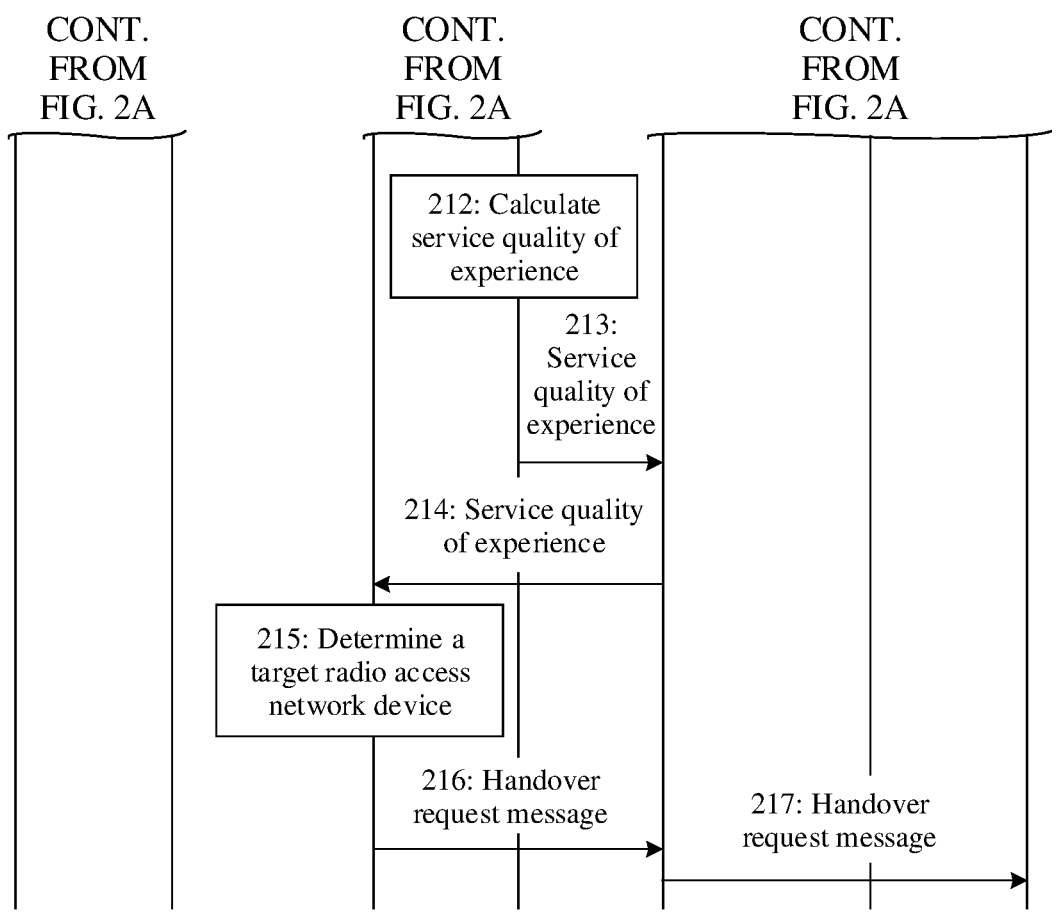

To ensure service experience of a user, the new RAN provides, based on AI/ML, a user-centric traffic steering (TS) solution, that is, a TS solution that is based on service quality of experience (QoE) at a UE granularity. FIG. 2A and FIG. 2B are a schematic interaction flowchart of a traffic steering method. A specific process is as follows.

201: An OAM receives a management request message input from the outside, and indicates, based on the management request message through an internal interface, a radio access management controller to create a policy instance. It should be understood that the OAM and the radio access management controller are logically two different functional modules, or may be separately used as independent network elements. However, currently, a common view in the industry is to integrate the radio access management controller into the OAM, and use the radio access management controller as an internal functional component module of the OAM. The OAM is a general name of a management network element, and may be specifically implemented by an open networking automation platform (ONAP), a network management system (NMS), or another management network element. In this embodiment, the radio access management controller is also used as a module component of the OAM to describe the solution.

202: The radio access management controller obtains policy information by establishing a policy model, and sends the service steering policy information to a radio access intelligent controller through an R5 interface, where the policy information includes information such as a policy target (QoE target) and an application object of a policy. It should be understood that the policy target may be understood as target quality of experience, and the application object of the policy may be understood as a service type for which the policy is used.

The radio access intelligent controller may include internal functional component modules such as a traffic steering function (TS function), a service quality of experience prediction function (QoE prediction function, QP function), and a common function. The common function includes other common functional component modules of the radio access intelligent controller, such as a subscription management and an interface management. The TS function may be configured to implement TS steering functions such as policy execution condition determining and policy decision-making. When the TS function is deployed, a type of data (for example, UE performance data, cell performance data, service performance data, or UE signal measurement information) that needs to be consumed for function execution of the TS function, policy information (for example, a service QoE-based steering policy), and the like need to be determined. The QP function may be configured to perform QoE calculation and prediction. Similarly, when the QP function is deployed, a type of data (for example, UE performance data, cell performance data, service performance data, or UE signal measurement information) that needs to be consumed for function execution of the QP function and a type of data generated by the QP function (for example, service QoE, UE QoE, or cell QoE) need to be determined.

The TS function and the QP function may be used as internal functional component modules of the radio access intelligent controller. Alternatively, the TS function and the QP function may be independent of the radio access intelligent controller and separately used as independent network elements. In this case, information exchange between the TS function and the radio access intelligent controller and information exchange between the QP function and the radio access intelligent controller are separately implemented through explicit external interfaces. The solution of the present disclosure is not limited to the foregoing two manners. The solution includes an interface message for communication between the TS function and the QP function and interface messages for communication between the TS function and the common function and for communication between the QP function and the common function.

Specifically, the radio access management controller may send the service steering policy information to the internal functional component module TS function of the radio access intelligent controller.

203: The TS function sends a first subscription request message to the common function based on the received policy information, where the first subscription request message is used to request to obtain performance data information corresponding to service flows of a plurality of terminal devices that have accessed a current radio access network device. The first request message includes identifiers of the plurality of terminal devices and identifiers corresponding to the service flows.

204: The common function receives the first subscription request message, and sends the first subscription request message to a DU.

205: The DU receives the first subscription request message, and after completing subscribed data collection, sends a first response message to the common function, where the first response message includes the performance information corresponding to the service flows of the plurality of terminal devices that have accessed the current radio access network device.

206: The common function receives the first response message, and sends the first response message to the TS function, to be specific, sends, to the TS function, the performance information corresponding to the service flows of the plurality of terminal devices that have accessed the current radio access network device.

207: The TS function determines, based on the obtained performance information corresponding to the service flows of the plurality of terminal devices that have accessed the current radio access network device, terminal devices whose performance information does not meet a requirement or terminal devices whose actual quality of experience does not meet target quality of experience, so as to determine a set of identifiers of the terminal devices that need to be handed over to another radio access network device.

For example, the performance information may be signal quality information. If signal quality obtained by a terminal device on the current radio access network device does not meet target signal quality, the terminal device is determined to be handed over to another radio access network device.

208: The TS function sends a second subscription request message to the common function, to obtain performance data information of at least one other radio access network device. The second subscription request message includes the identifier of the terminal device that needs to be handed over to another radio access network device and an identifier corresponding to a service flow.

209: The common function receives the second subscription request message, and sends the second subscription request message to the DU.

210: The DU receives the second subscription request message, and after completing data collection, sends a second response message to the common function, where the second response message includes the performance data information of the another radio access network device.

211: The common function receives the second response message, and sends the second response message to the QP function.

212: The QP function receives the second response message, and calculates, based on the performance data information in the second response message, service quality of experience of a service flow corresponding to the terminal device that needs to be handed over to another radio access network device.

213: The QP function sends service quality of experience information to the common function, so that the common function sends the service quality of experience information to the TS function.

214: The common function receives the service quality of experience information, and sends the service quality of experience information to the TS function.

215: The TS function receives the service quality of experience information, and determines at least one target radio access network device based on the service quality of experience and the target quality of experience of the terminal device that needs to be handed over to another radio access network device, where the target radio access network device can meet target quality of experience corresponding to a service flow of at least one terminal device that needs to be handed over to another radio access network device.

216: The TS function sends a handover request message to the common function, so that the common function sends the handover request message to an O-CU-CP. The handover request message includes the identifier of the terminal device that needs to be handed over to another radio access network device and an identifier of the target radio access network device.

217: The common function receives the handover request message, and sends the handover request message to the O-CU-CP. The O-CU-CP hands over the terminal device that needs to be handed over to another radio access network device to the target radio access network device.

In the foregoing solution, the radio access intelligent controller subscribes to required performance data from the DU based on a traffic steering policy requirement, and calculates QoE of UE on the current radio access network device based on the performance data obtained from the DU. If the current QoE of the UE does not meet a QoE target, performance data of another radio access network device is further obtained, a radio access network device that can meet the QoE target of the UE is selected as a target radio access network device, and the O-CU-CP is indicated to hand over the UE to the target radio access network device. After being handed over to the target radio access network device, the UE disconnects from the radio access network device that originally provides a service.

In the 5G network era, a network can support more abundant service types and application scenarios, such as cloud virtual reality (Cloud VR), unmanned aerial vehicle, and 8K live video. These different types of services have greatly different requirements on network performance. For example, the cloud VR has high requirements on a network delay and bandwidth, and the 8K live video has high requirements on a network delay, bandwidth, and a packet loss rate. For UE, the UE may be interested in a plurality of types of services at the same time.

The following briefly describes a problem in a current technology by using the unmanned aerial vehicle scenario as an example. An unmanned aerial vehicle (UAV) terminal device performs, through a wireless network, data or signaling exchange of different service types, for example, a flight control instruction and high-speed services such as high-definition video and picture backhaul, and these services have greatly different requirements on network performance. For example, the flight control instruction has a low requirement on bandwidth, and the high-speed services such as the high-definition video and picture backhaul have high requirements on bandwidth and a packet loss rate.

In this case, in a scenario in which the UE performs a plurality of types of services at the same time, when QoE corresponding to a service type of the UE meets a requirement, QoE of all services of the UE may not meet a requirement. Therefore, if handover is performed based on QoE corresponding to a service type of the UE, after the UE is handed over to a target radio access network device, performance targets of all the services of the UE may still not be met. In addition, when the UE simultaneously performs a plurality of types of services, because QoE of these services differs greatly, it is difficult to find a target radio access network device that can meet the QoE corresponding to all the services to support handover processing for the UE.

Therefore, for a disadvantage of the current technology, embodiments of the present disclosure provide a service traffic steering method, to resolve a technical problem in the current technology that traffic steering at a service granularity cannot be supported.

FIG. 3 is a schematic flowchart of a service traffic steering method according to an embodiment of the present disclosure. The service steering method is a technical solution proposed for traffic steering at a service granularity. When a currently accessed serving base station cannot meet target quality of experience of a service of UE, the service is connected to a base station that can meet the target quality of experience corresponding to the service, so that the UE can be connected to a plurality of radio access network devices at the same time. This ensures communication requirements of different service types, and improves user experience.

310: A first network device obtains first quality of experience corresponding to a first service flow of at least one first terminal device. Specifically, the first network device obtains the first quality of experience corresponding to the first service flow of the at least one first terminal device from a first radio access network device, where the first radio access network device is a radio access network device currently accessed by the at least one terminal device. It should be understood that there may be one or more first terminal devices accessing the first radio access network device, and the first network device may obtain first quality of experience corresponding to a first service flow of one first terminal device accessing the first radio access network device, or may obtain first quality of experience corresponding to first service flows of a plurality of first terminal devices accessing the first radio access network device. Optionally, the first network device may be a radio access intelligent controller.

Optionally, that a first network device obtains first quality of experience corresponding to a first service flow of at least one first terminal device includes:

The first network device sends a first request message to the first radio access network device, where the first request message is used to subscribe to first performance data information corresponding to the first service flow of the at least one first terminal device, for example, signal measurement data of the terminal device, and the first request message includes an identifier of the at least one first terminal device and a first identifier corresponding to the first service flow. The first identifier is used to identify a service type corresponding to the first service flow.

The first radio access network device collects, based on the first request message sent by the first network device, the first performance data information corresponding to the first service flow of the at least one first terminal device, and sends the first performance data information to the first network device.

The first network device receives a first response message sent by the first radio access network device, where the first response message includes the first performance data information corresponding to the first service flow of the at least one first terminal device.

The first network device determines, based on the first performance information, the first quality of experience obtained by the at least one first terminal device from the first radio access network device.

Optionally, before the first network device obtains the first quality of experience corresponding to the first service flow of the at least one first terminal device, the first network device may further determine, based on the first service flow, the first identifier corresponding to the first service flow, where the first identifier is used by the first radio access network device to identify the first service flow. The first identifier may include a quality of service flow identifier (QFI) or a 5G quality of service indicator (5Q1).

Specifically, the first network device may send, to the first radio access network device, a request message used to obtain the QFI or the 5QI corresponding to the first service flow. Because a radio access device does not sense service flow information, the first access network device does not know the QFI or the 5QI corresponding to the first service flow. In this case, the first radio access network may send the request message to a core network device through an interface between the first radio access network device and the core network device. The core network device queries, based on the request message, for the first identifier corresponding to the first service flow, and sends the first identifier, for example, the QFI or the 5QI, corresponding to the first service flow to the first radio access network device. The first radio access network device receives the first identifier that corresponds to the first service flow and that is sent by the core network device, and sends the first identifier to the first network device. Optionally, the core network device may be an AMF or an SMF.

It should be understood that in a current wireless network, an N2 interface between a radio access network device and a core network device does not support the radio access network device in requesting service-related information from the core network device. Therefore, in this embodiment, a function of the N2 interface is enhanced, and a newly defined N2 interface message may support the function. In this embodiment, a name and a type of the N2 interface message are not specifically limited, and only an N2 message is used for description. However, all interface messages supporting a related function fall within the protection scope of the present disclosure. Optionally, before the first network device determines, based on the first service flow, the first identifier corresponding to the first service flow, the method further includes: The first network device receives a fourth message sent by a second network device, where the fourth message includes steering policy information corresponding to the first service flow, and the steering policy information includes target quality of experience (a policy target) and an application object of a policy. The application object of the policy may be understood as a service type for which the policy is used. The second network device may be a radio access management controller.

320: The first network device determines at least one second terminal device in the at least one first terminal device based on the first quality of experience, where first quality of experience corresponding to a first service flow of the second terminal device does not meet target quality of experience corresponding to the first service flow of the second terminal device, or first performance data information corresponding to a first service flow of the second terminal device does not meet target performance data information corresponding to the first service flow of the second terminal device.

330: The first network device determines a target radio access network device, where the target radio access network device meets the target quality of experience corresponding to the first service flow of the at least one second terminal device. There may be one or more target radio access network devices.

Specifically, optionally, a process in which the first network device determines the target radio access network device includes:

The first network device sends a second request message to the first radio access network device, where the second request message is used to obtain a plurality of pieces of second performance data information that correspond to the first service flow and that are obtained by the at least one second terminal device from a plurality of second radio access network devices, and the second request message includes an identifier of the at least one second terminal device and a first identifier used to identify the first service flow.

The first radio access network device receives the second request message sent by the first network device, and collects, based on the second request message, the plurality of pieces of second performance data information that correspond to the first service flow and that are separately obtained by the at least one second terminal device from the plurality of second radio access network devices. The second performance data information is, for example, an uplink/downlink packet data convergence protocol (PDCP) throughput and physical resource block (PRB) usage. It should be understood that the first radio access network device may obtain second performance data information that corresponds to a first service flow and that is obtained by each second terminal device from the plurality of second radio access network devices.

The first radio access network device sends a second response message to the first network device, where the second response message includes the plurality of pieces of obtained second performance data information corresponding to the first service flow of the at least one second terminal device.

The first network device receives the second response message sent by the first radio access network device.

The first network device determines, based on the plurality of pieces of second performance data information in the second response message, a plurality of pieces of second quality of experience corresponding to the first service flow of the at least one second terminal device, where a plurality of pieces of second quality of experience of each second terminal device are in a one-to-one correspondence with the plurality of second radio access network devices.

The first network device determines the target radio access network device in the plurality of second radio access network devices based on the plurality of pieces of second quality of experience, where second quality of experience that corresponds to the first service flow and that is obtained by the at least one second terminal device from the target radio access network device meets the target quality of experience. There may be one or more target radio access network devices. When there is one second terminal device, there is one target radio access network device that meets target quality of experience corresponding to a first service flow of the second terminal device. When there is a plurality of second terminal devices, there may be one or more target radio access network devices that meet target quality of experience corresponding to first service flows of the plurality of second terminal devices.

340: After determining the target radio access network device, the first network device connects the first service flow of the at least one second terminal device to the target radio access network device. Optionally, before connecting the first service flow of the at least one second terminal device to the target radio access network device, the first network device needs to learn of capability information indicating whether the at least one second terminal device supports dual connectivity. It should be understood that the second terminal device supports a plurality of service types, in other words, the second terminal device supports a plurality of service flows. The first service flow is connected to the target radio access network device, and another service flow is still connected to the first radio access network device or another radio access network device. Therefore, the first service flow of the second terminal device can be connected to the target radio access network device only when the second terminal device has a capability of supporting dual connectivity.

Optionally, the first network device sends a third request message to the first radio access network device, where the third request message is used to subscribe to the capability information indicating whether the at least one second terminal device supports dual connectivity, and the third request message includes the identifier of the at least one second terminal device. The first radio access network device receives the third request message sent by the first network device, and determines or collects, based on the third request message, the capability information indicating whether the at least one second terminal device supports dual connectivity. The first radio access network device sends a third response message to the first network device, where the third response message includes the capability information indicating whether the at least one second terminal device supports dual connectivity. The first network device receives the third response message sent by the first radio access network device, obtains the capability information of the second terminal device based on the third response message, and determines whether the at least one second terminal device supports dual connectivity.

Optionally, if the second terminal device supports dual connectivity, the first network device sends traffic steering indication information to the first radio access network device, to enable the first radio access network device to connect, to the target radio access network device, the first service flow of the second terminal device that supports dual connectivity. Optionally, the traffic steering indication information may include the identifier of the second terminal device, the first identifier used to identify the first service flow, an identifier of the target radio access network device, and dual connectivity indication information, and the dual connectivity indication information indicates to connect the first service flow of the second terminal device to the target radio access network device.

It should be understood that if a target radio access network device can meet target quality of experience corresponding to first service flows of a plurality of second terminal devices, the plurality of second terminal devices may all access the target radio access network device. If target radio access network devices that meet target quality of experience corresponding to first service flows of different second terminal devices are different, the first service flows of the different second terminal devices are separately connected to the different corresponding target radio access network devices. Optionally, if a second terminal device does not support dual connectivity, the traffic steering indication information sent to the first radio access network device may not include an identifier of the second terminal device.

Optionally, the first network device may alternatively send the traffic steering indication information to the first radio access network device without obtaining the capability information indicating whether the at least one second terminal device supports dual connectivity. This is not limited in this embodiment.

After receiving the traffic steering indication information sent by the first network device, the first radio access network device connects the first service flow of the second terminal device to the target radio access network device that can meet the target quality of experience of the first service flow.

In the technical solution provided in this embodiment, when the currently accessed first radio access network device does not meet the target quality of experience or target performance corresponding to the first service flow of the second terminal device, only the first service flow of the second terminal device may be connected to the target radio access network device that can meet the target quality of experience of the first service flow of the second terminal device, and there is no need to hand over the second terminal device to the target radio access network device. In this way, the second terminal device can be connected to a plurality of radio access network devices at the same time, so that communication requirements of different service types are ensured, and user experience is improved.

To effectively use radio resources, after data transmission corresponding to the first service flow of the second terminal device ends, a connection between the second terminal device and the target radio access network device may be released in time.

Optionally, in an implementation, the first network device may further send dual connectivity release indication information to the first radio access network device, where the dual connectivity release indication information indicates the first radio access network device to release the connection between the second terminal device and the target radio access network device after service data transmission corresponding to the first service flow is completed, and the dual connectivity release indication information includes the identifier of the second terminal device. The first radio access network device keeps monitoring, based on the indication information sent by the first network device, a transmission state of service data corresponding to the first service flow of the second terminal device. After the service data transmission corresponding to the first service flow is completed, the first radio access network device actively releases the connection between the second terminal device and the target radio access network device, that is, releases dual connectivity of the second terminal device. Optionally, after the connection between the second terminal device and the target radio access network device is released, the first radio access network device may send a dual connectivity release complete message to the first network device. The dual connectivity release complete message includes the identifier of the second terminal device.

Optionally, in another implementation, the first network device may alternatively send a fourth request message to the first radio access network device, where the fourth request message indicates the first radio access network device to send a service data transmission complete message after service data transmission corresponding to the first service flow is completed, the fourth request message includes the identifier of the at least one second terminal device and the first identifier used to identify the first service flow, and the service data transmission complete message includes the identifier of the at least one second terminal device and the first identifier used to identify the first service flow. The first radio access network device keeps monitoring, based on the fourth request message sent by the first network device, a transmission state of service data corresponding to the first service flow of the second terminal device. After the service data transmission corresponding to the first service flow is completed, the first radio access network device sends the service data transmission complete message to the first network device.

The first network device receives the service data transmission complete message sent by the first radio access network device, and determines, based on the service data transmission complete message, whether to release the connection between the second terminal device and the target radio access network device.

If the first network device determines to release the connection between the second terminal device and the target radio access network device, the first network device sends dual connectivity release indication information to the first radio access network device through an R2/R3/R4 interface, where the dual connectivity release indication information indicates to release the connection between the second terminal device and the target radio access network device. Optionally, the dual connectivity release indication information includes the identifier of the second terminal device.

If the first network device needs to connect another service flow of the second terminal device to the target access network device, the first network device determines not to release the connection between the second terminal device and the target radio access network device. The first network device modifies a dual connectivity configuration, and sends dual connectivity update indication information to the first radio access network device, where the dual connectivity update indication information may indicate to connect a service flow of a second service type of the second terminal device to the target radio access network device, and the dual connectivity update indication information includes dual connectivity modification configuration information.

It should be understood that although the CU and the DU in the system architecture provided in embodiments of the present disclosure are separated, embodiments of the present disclosure are also applicable to a network architecture in which network elements in a radio access network device are not separated.

Figure 4A:
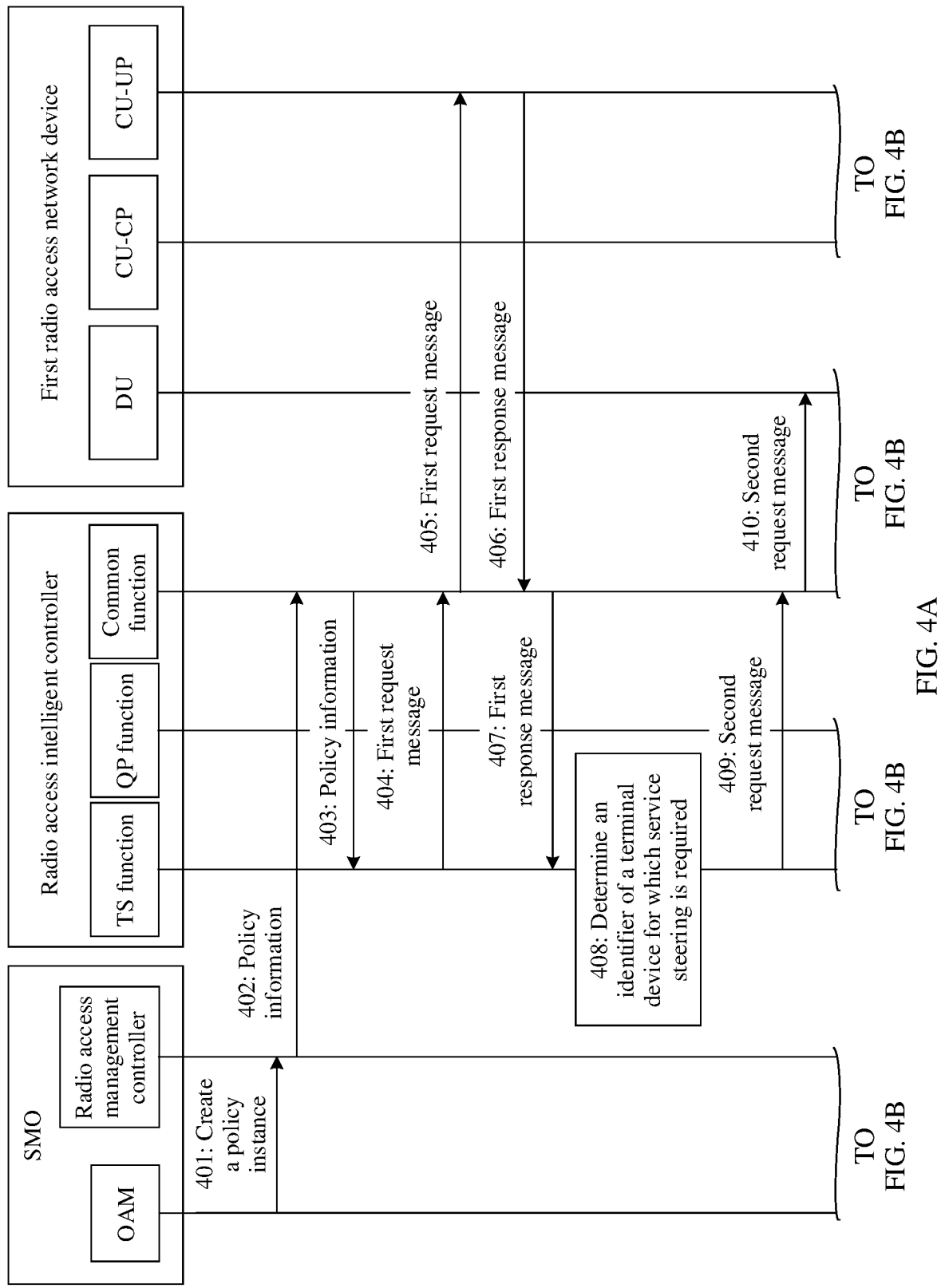
FIG. 4A and FIG. 4B are a schematic interaction flowchart of traffic steering according to an embodiment of the present disclosure.
Figure 4B:
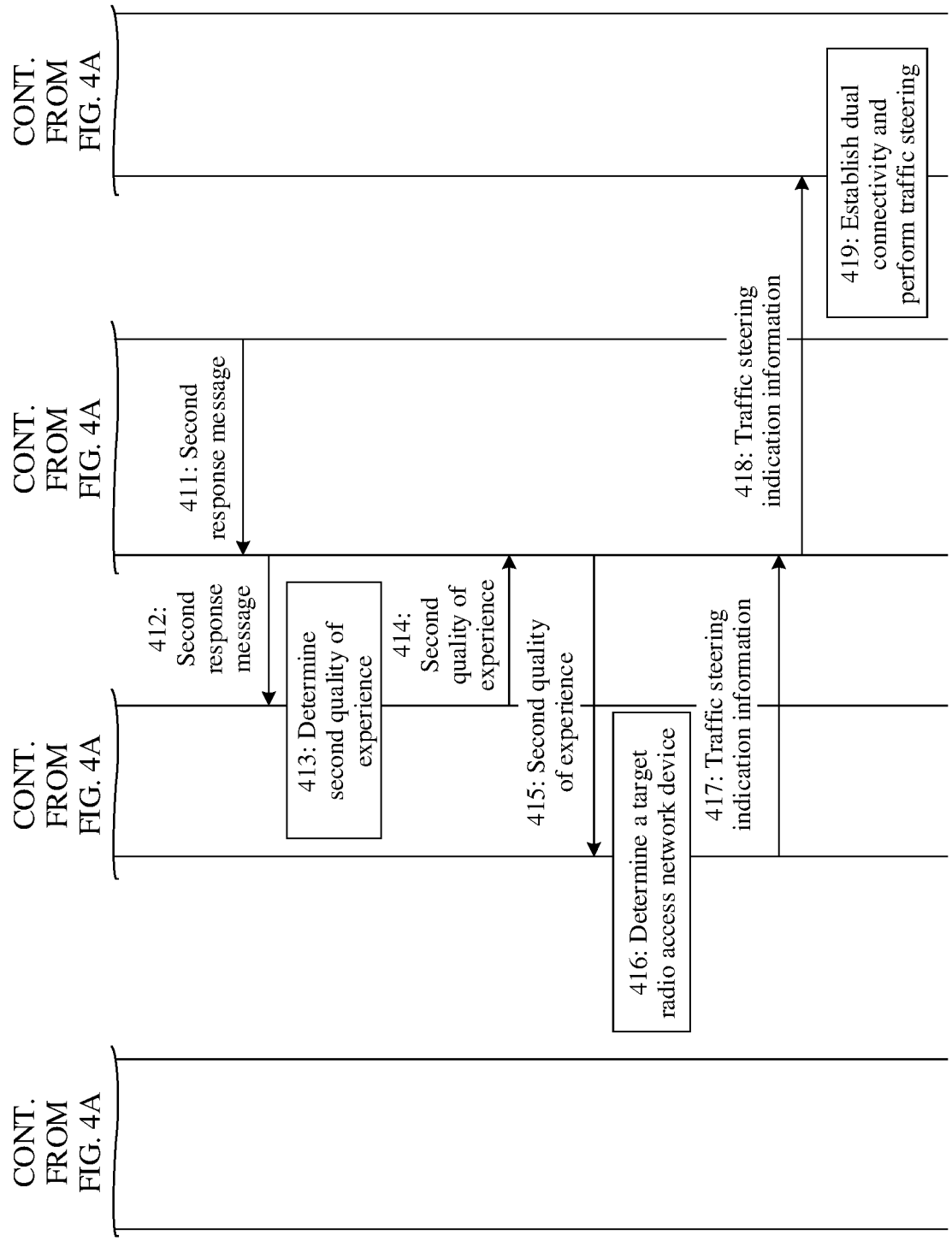

A radio access intelligent controller may include a TS function, a QP function, and a common function. The TS function, the QP function, and the common function may be integrated inside the first network device, and are used as internal functional component modules of the first network device. A radio access management controller and an OAM may be used as internal functional component modules of a service management function. A radio access network device includes internal functional units such as a DU, a CU-CP, and a CU-UP. FIG. 4A and FIG. 4B are a schematic interaction flowchart of traffic steering.

401: An OAM receives a management request message, namely, a TS policy deployment request message, input from the outside, and indicates, through an internal interface, a radio access management controller to create a policy instance. The management request message may be sent by a network administrator.

402: The radio access management controller obtains service steering policy information by establishing a policy model, and sends the service steering policy information to a common function in a radio access intelligent controller through an R5 interface, where the policy information includes target quality of experience and an application object of a policy, and the application object of the policy may be understood as a service type for which the policy is used.

403: After receiving the TS policy information sent by the radio access management controller, the common function notifies, through an internal interface, a TS function of the TS policy information sent by the radio access management controller.

404: The TS function may determine, based on the application object of the policy in the TS policy information, a first identifier, for example, a QFI or a 5QI, corresponding to a service flow for which the policy is used. Specifically, the TS function sends, to the common function, a request message used to obtain the QFI/5QI corresponding to the application object of the policy, where the request message includes a requested service object and a requested data type, the service object may include a service type identified by a service type, that is, may include a service type corresponding to a first service flow, and the data type may be the QFI or the 5QI. The common function receives the request message that is sent by the TS function and that is used to obtain the QFI/5QI corresponding to the application object of the policy, and sends the request message to a CU-CP unit in a first radio access network device through an R2 interface. Because the CU-CP unit does not sense service information such as the service type, the CU-CP unit does not know the QFI/5QI corresponding to the service type. In this case, the CU-CP in the first radio access network device sends the request message to a network element in a core network through an N2 interface, and the network element in the core network may be an AMF or an SMF. After querying for the QFI/5QI used by a service corresponding to the service type, the network element of the core network sends QFI/5QI information to an O-CU-CP unit in the first radio access network device through an N2 interface. After receiving the QFI/5QI information sent by the core network, the CU-CP unit sends the QFI/5QI information to the common function through the R2 interface, and then the common function sends the QFI/5QI information to the TS function. It should be understood that, in the technical solution provided in this embodiment, a second terminal device supports a plurality of service types at the same time, and the radio access intelligent controller needs to obtain a QFI/5QI used for each service type. Otherwise, a network element in the first radio access network device cannot identify information corresponding to a first service flow.

The TS function determines, based on the TS policy information and function logic of the TS function, performance data information that needs to be consumed by the TS function, and sends a first request message to the common function, to subscribe to first performance data information of at least one first terminal device. The first request message includes an identifier of the at least one first terminal device and a first identifier corresponding to a first service flow, and the first identifier may be a QFI/5QI. The first terminal device is a terminal device that has accessed the first radio access network device.

405: The common function receives the first request message, and sends the first request message to a CU-UP in the first radio access network device through an R3 interface.

406: The CU-UP receives the first request message, and after completing subscribed data collection based on the first request message, sends a first response message to the common function, where the first response message includes performance information corresponding to the first service flow of the at least one first terminal device that has accessed the first radio access network device.

407: The common function receives the first response message, and sends the first response message to the TS function, to be specific, sends, to the TS function, first performance information corresponding to the first service flow of the at least one first terminal device that has accessed the first radio access network device. The TS function receives the first response message, and obtains the first performance information corresponding to the first service flow of the at least one first terminal device.

408: The TS function determines, based on the obtained first performance information corresponding to the first service flow of the at least one first terminal device that has accessed the first radio access network device, terminal devices whose first performance information does not meet a requirement. Alternatively, the TS function determines, based on the obtained first performance information corresponding to the first service flow of the at least one first terminal device that has accessed the first radio access network device, first quality of experience corresponding to each first terminal device, and determines terminal devices whose first quality of experience does not meet target quality of experience, so as to determine a set of second terminal devices whose first service flows need to be handed over to another radio access network device, in other words, determine an identifier of the second terminal device for which service steering needs to be performed. It should be understood that the second terminal device is a terminal device, in the first terminal device, whose first performance information does not meet the requirement or whose first quality of experience does not meet the target quality of experience.

409: After determining the second terminal device for which service steering needs to be performed, the TS function further needs to determine target radio access network devices to which the first service flow of the second terminal device is to be steered. Therefore, the TS function needs to obtain a plurality of pieces of second performance data information that correspond to the first service flow and that are obtained by at least one second terminal device from a plurality of second radio access network devices, where the second radio access network device may be a radio access network device adjacent to the first radio access network device. The TS function sends a second request message to the common function, where the second request message is used to obtain the plurality of pieces of second performance data information that correspond to the first service flow and that are obtained by the at least one second terminal device from the plurality of second radio access network devices, and the second request message includes an identifier of the at least one second terminal device and a first identifier used to identify the first service flow.

410: After receiving the second request message, the common function forwards the second request message to a QP function. The QP function determines, based on the second request message and function logic of the QP function, data information that needs to be consumed by the QP function, and sends the second request message to the common function. Then, the common function sends the second request message to a DU in the first radio access network device through an R4 interface.

411: The DU collects performance data based on the received second request message, and sends a second response message to the common function through the R4 interface, where the second response message includes the plurality of pieces of second performance data information that correspond to the first service flow and that are separately obtained by the at least one second terminal device from the plurality of second radio access network devices. The second performance data information may include signal measurement data.

412: The common function receives the second response message sent by the DU, and forwards the second response message to the QP function.

413: The QP function receives the second response message forwarded by the common function, and determines, based on the plurality of pieces of second performance data information in the second response message, a plurality of pieces of second quality of experience corresponding to the first service flow of the at least one second terminal device, where a plurality of pieces of second quality of experience of each second terminal device are in a one-to-one correspondence with the plurality of second radio access network devices.

414: After determining, through calculation, the plurality of second quality of experience corresponding to the first service flow of the at least one second terminal device, the QP function sends second quality of experience information to the common function.

415: The common function forwards the second quality of experience information to the TS function.

416: The TS function determines the target radio access network device in the plurality of second radio access network devices based on the plurality of pieces of second quality of experience, where second quality of experience that corresponds to the first service flow and that is obtained by the at least one second terminal device from the target radio access network device meets the target quality of experience. There may be one or more target radio access network devices. When there is one second terminal device, there is one target radio access network device that meets target quality of experience corresponding to a first service flow of the second terminal device. When there is a plurality of second terminal devices, there may be one or more target radio access network devices that meet target quality of experience corresponding to first service flows of the plurality of second terminal devices.

417: The TS function sends traffic steering indication information to the common function, so that the common function sends the traffic steering indication information to the CU-CP, where the traffic steering indication information includes the identifier of the second terminal device, the first identifier used to identify the first service flow, an identifier of the target radio access network device, and dual connectivity indication information, and the dual connectivity indication information indicates to connect the first service flow of the second terminal device to the target radio access network device.

418: The common function sends the traffic steering indication information to the CU-CP through the R2 interface.

419: The CU-CP connects, based on the received traffic steering indication information, the first service flow of the second terminal device to the target radio access network device.

To improve reliability of connecting the first service flow of the second terminal device to the target radio access network device, optionally, before sending the traffic steering indication information, the TS function may obtain, from the CU-CP, capability information indicating whether the at least one second terminal device supports dual connectivity. If a second terminal device does not support dual connectivity, the sent traffic steering indication information may not include an identifier of the second terminal device, in other words, may not indicate to connect a first service flow of the second terminal device to the target radio access network device.

Figure 5:
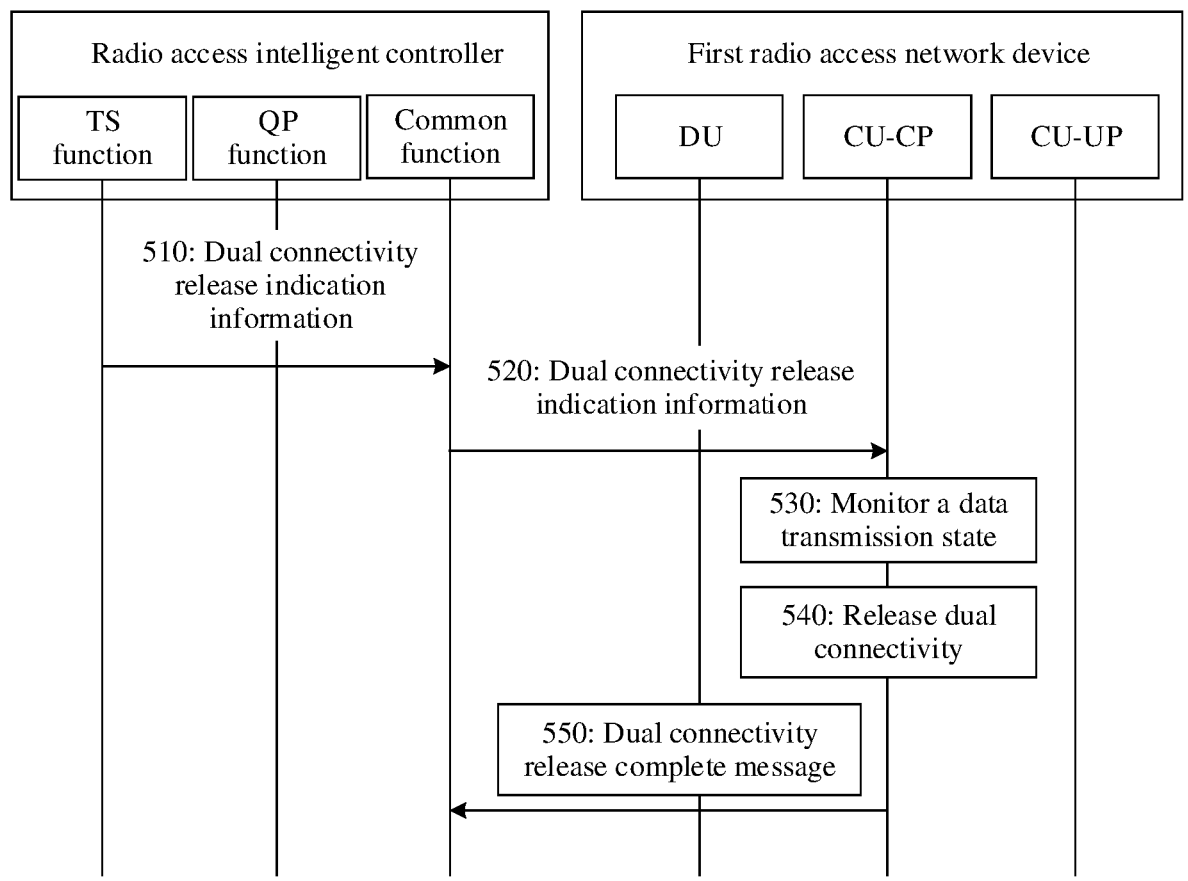
FIG. 5 is a schematic interaction flowchart of dual connectivity releasing according to an embodiment of the present disclosure.

To effectively use radio resources, after data transmission corresponding to the first service flow of the second terminal device ends, a connection between the second terminal device and the target radio access network device may be released in time. FIG. 5 is a schematic interaction flowchart of dual connectivity releasing. A specific process includes the following steps.

510: A TS function sends dual connectivity release indication information to a common function, where the dual connectivity release indication information indicates a first radio access network device to release a connection between a second terminal device and a target radio access network device after service data transmission corresponding to a first service flow is completed, and the dual connectivity release indication information includes an identifier of the second terminal device.

520: The common function sends the dual connectivity release indication information to a CU-CP through an R2 interface.

530: The CU-CP keeps monitoring, based on the indication information sent by the common function, a transmission state of service data corresponding to the first service flow of the second terminal device.

540: After the service data transmission corresponding to the first service flow is completed, the connection between the second terminal device and the target radio access network device is actively released, that is, dual connectivity of the second terminal device is released.

550: After the connection between the second terminal device and the target radio access network device is released, the CU-CP sends a dual connectivity release complete message to the common function, where the dual connectivity release complete message includes the identifier of the second terminal device.

Figure 6:
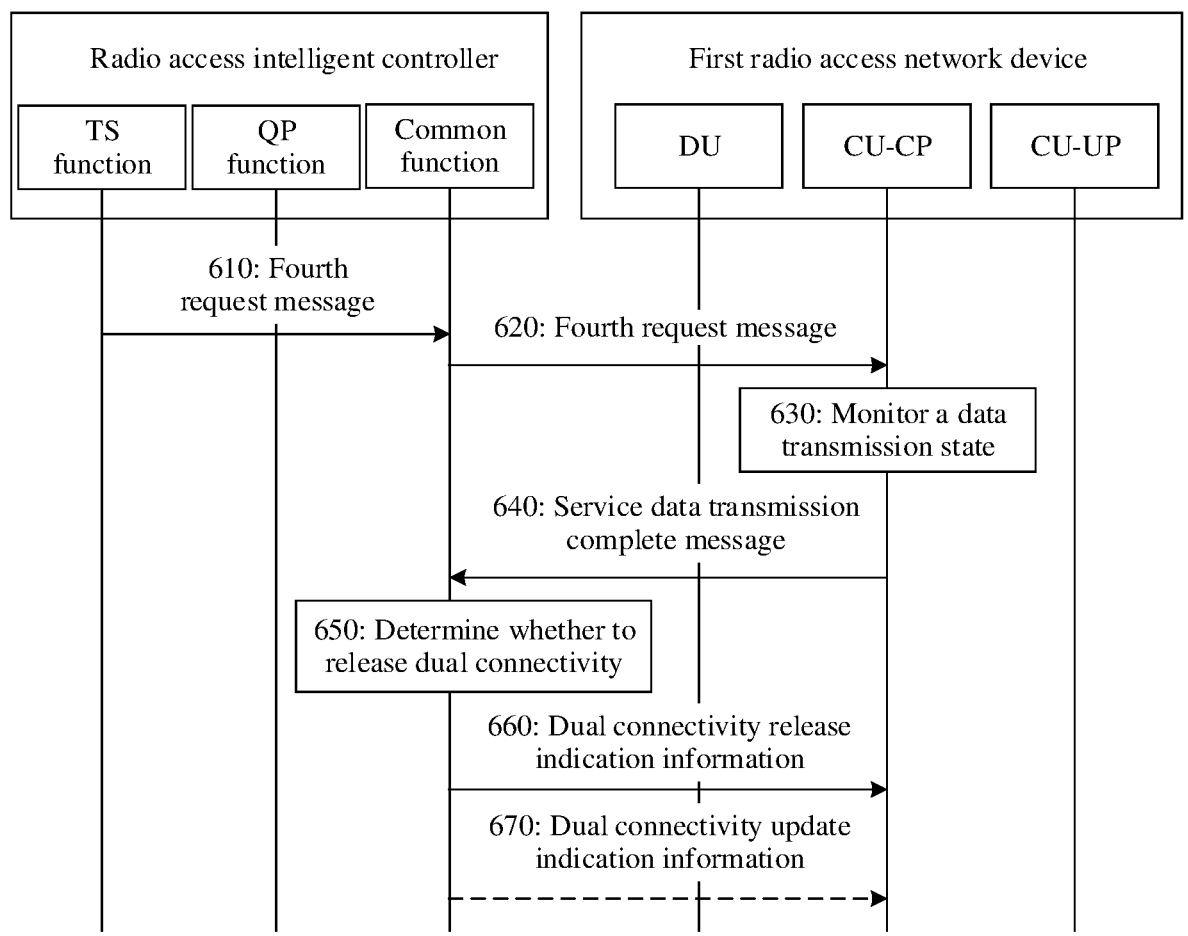
FIG. 6 is a schematic interaction flowchart of other dual connectivity releasing according to an embodiment of the present disclosure.
Figure 7:
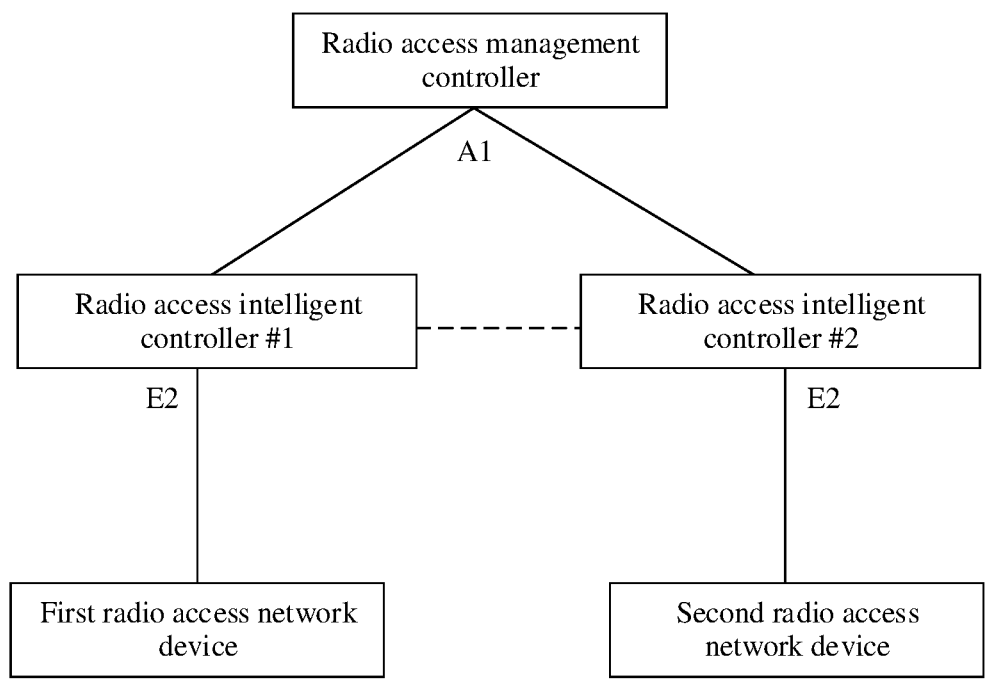
FIG. 7 is a schematic diagram of a cross-radio access intelligent controller collaboration scenario according to an embodiment of the present disclosure.

FIG. 6 is a schematic interaction flowchart of other dual connectivity releasing. A specific process includes the following steps.

610: A TS function sends a fourth request message to a common function, where the fourth request message indicates a first radio access network device to send a service data transmission complete message after service data transmission corresponding to a first service flow is completed, the fourth request message includes an identifier of at least one second terminal device and a first identifier used to identify the first service flow, and the service data transmission complete message includes the identifier of the at least one second terminal device and the first identifier used to identify the first service flow.

620: The common function sends the fourth request message to a CU-CP through an R2 interface.

630: The CU-CP keeps monitoring, based on the fourth request message sent by the common function, a transmission state of service data corresponding to the first service flow of the second terminal device.

640: After the service data transmission corresponding to the first service flow is completed, the CU-CP sends the service data transmission complete message to the common function through the R2 interface.

650: The common function receives the service data transmission complete message, and determines, based on the service data transmission complete message, whether to release a connection between the second terminal device and a target radio access network device.

660: If determining to release the connection between the second terminal device and the target radio access network device, the common function sends dual connectivity release indication information to the CU-CP through the R2 interface, where the dual connectivity release indication information indicates to release the connection between the second terminal device and the target radio access network device, and the dual connectivity release indication information may include the identifier of the second terminal device. The CU-CP releases the connection between the second terminal device and the target radio access network device based on the received dual connectivity release indication information. Optionally, after the connection between the second terminal device and the target radio access network device is released, the CU-CP may further send a dual connectivity release complete message to the common function.

670: If another service flow of the second terminal device needs to be connected to the target access network device, the common function determines not to release the connection between the second terminal device and the target radio access network device, and sends dual connectivity update indication information to the CU-CP through the R2 interface, where the dual connectivity update indication information may indicate to connect a service flow of a second service type of the second terminal device to the target radio access network device, and the dual connectivity update indication information includes dual connectivity modification configuration information. The CU-CP may connect the service flow of the second service type of the second terminal device to the target radio access network device based on the received dual connectivity update indication information.

Because coverage of a radio access intelligent controller is limited, and coverage areas of different radio access intelligent controllers are independent of each other, the radio access intelligent controller can only obtain network data of a radio access network device within the coverage of the radio access intelligent controller through an R2/R3/R5 interface. As shown in FIG. 8, if a serving radio access network device of UE is a first radio access network device, and a second radio access network device is adjacent to the first radio access network device, where the first radio access network device is within coverage of a radio access intelligent controller #1, and the second radio access network device is within coverage of a radio access intelligent controller #2, the radio access intelligent controller #1 cannot directly obtain performance data information corresponding to the second radio access network device adjacent to the first radio access network device, and therefore the radio access intelligent controller #1 cannot predict QoE of a neighboring cell. Consequently, a target radio access network device for TS cannot be selected and determined.

An embodiment of the present disclosure provides a method for determining a target radio access network device. FIG. 8 is a schematic flowchart of a method 800 for determining a target radio access network device.

810: If an adjacent radio access network device of the first radio access network device is within coverage of another radio access intelligent controller, for example, the first radio access network device is within coverage of a first radio access intelligent controller, and the second radio access network device adjacent to the first radio access network device is within coverage of a second radio access intelligent controller, the first radio access intelligent controller sends a second request message to the second radio access intelligent controller through an R1 interface, where the second request message is used to obtain second performance data information that corresponds to a first service flow and that is obtained by at least one second terminal device from the second radio access network device, and the second request message includes an identifier of the at least one second terminal device and a first identifier used to identify the first service flow. Optionally, the second request message may further include information such as route identifiers of the first radio access intelligent controller and the second radio access intelligent controller.

820: The second radio access intelligent controller receives the second request message sent by the first radio access intelligent controller, determines the corresponding second radio access network device based on the second request message, and sends the second request message to the second radio access network device through an R2 interface.

830: After collecting the second performance data information that corresponds to the first service flow and that can be obtained by the second terminal device, the second radio access network device sends the second performance data information to the second radio access intelligent controller by using an R2 indication message.

840: The second radio access intelligent controller sends the second performance data information to the first radio access intelligent controller through the R1 interface, and then the first radio access intelligent controller determines, based on the second performance data information, a target radio access network device to which the first service flow of the second terminal device is to be connected.

Figure 9:
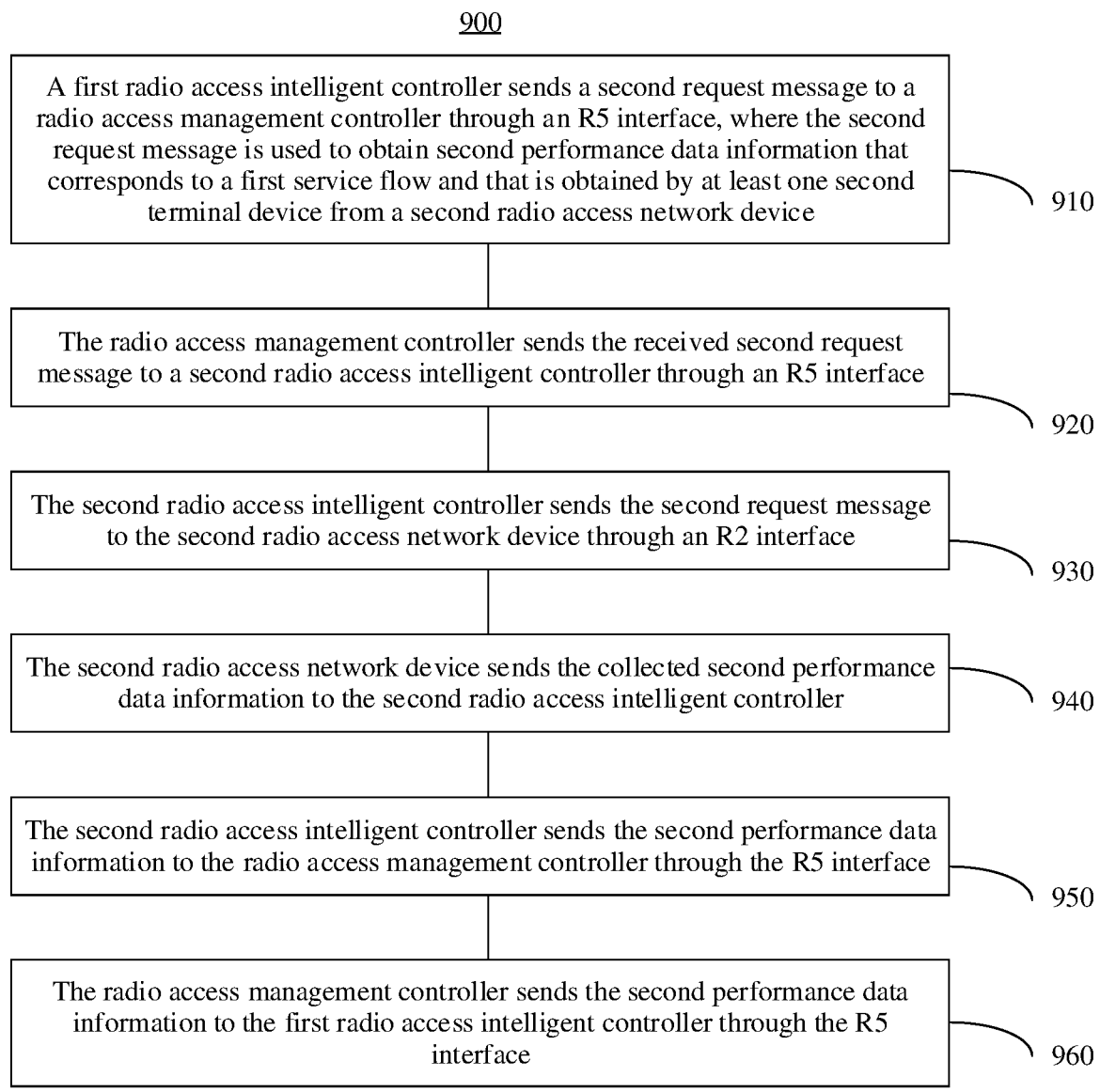
FIG. 9 is a schematic flowchart of another method for determining a target radio access network device according to an embodiment of the present disclosure.

An embodiment of the present disclosure provides another method for determining a target radio access network device. FIG. 9 is a schematic flowchart of another method 900 for determining a target radio access network device.

910: If an adjacent radio access network device of a first radio access network device is within coverage of another radio access intelligent controller, for example, the first radio access network device is within coverage of a first radio access intelligent controller, a second radio access network device adjacent to the first radio access network device is within coverage of a second radio access intelligent controller, and no R1 interface is deployed between the first radio access intelligent controller and the second radio access intelligent controller, the first radio access intelligent controller may send a second request message to a radio access management controller through an R5 interface, where the second request message is used to obtain second performance data information that corresponds to a first service flow and that is obtained by at least one second terminal device from the second radio access network device, and the second request message includes an identifier of the at least one second terminal device and a first identifier used to identify the first service flow.

920: The radio access management controller sends the received second request message to the second radio access intelligent controller through an R5 interface.

930: The second radio access intelligent controller receives the second request message sent by the radio access management controller, determines the corresponding second radio access network device based on the second request message, and sends the second request message to the second radio access network device through an R2/R3/R4 interface.

940: After collecting the second performance data information that corresponds to the first service flow and that can be obtained by the second terminal device, the second radio access network device sends the second performance data information to the second radio access intelligent controller by using an R2/R3/R4 indication message.

950: The second radio access intelligent controller sends the second performance data information to the radio access management controller through the R5 interface.

960: The radio access management controller sends the second performance data information to the first radio access intelligent controller through the R5 interface, and then the first radio access intelligent controller determines, based on the second performance data information, a target radio access network device to which the first service flow of the second terminal device is to be connected.

Figure 10:
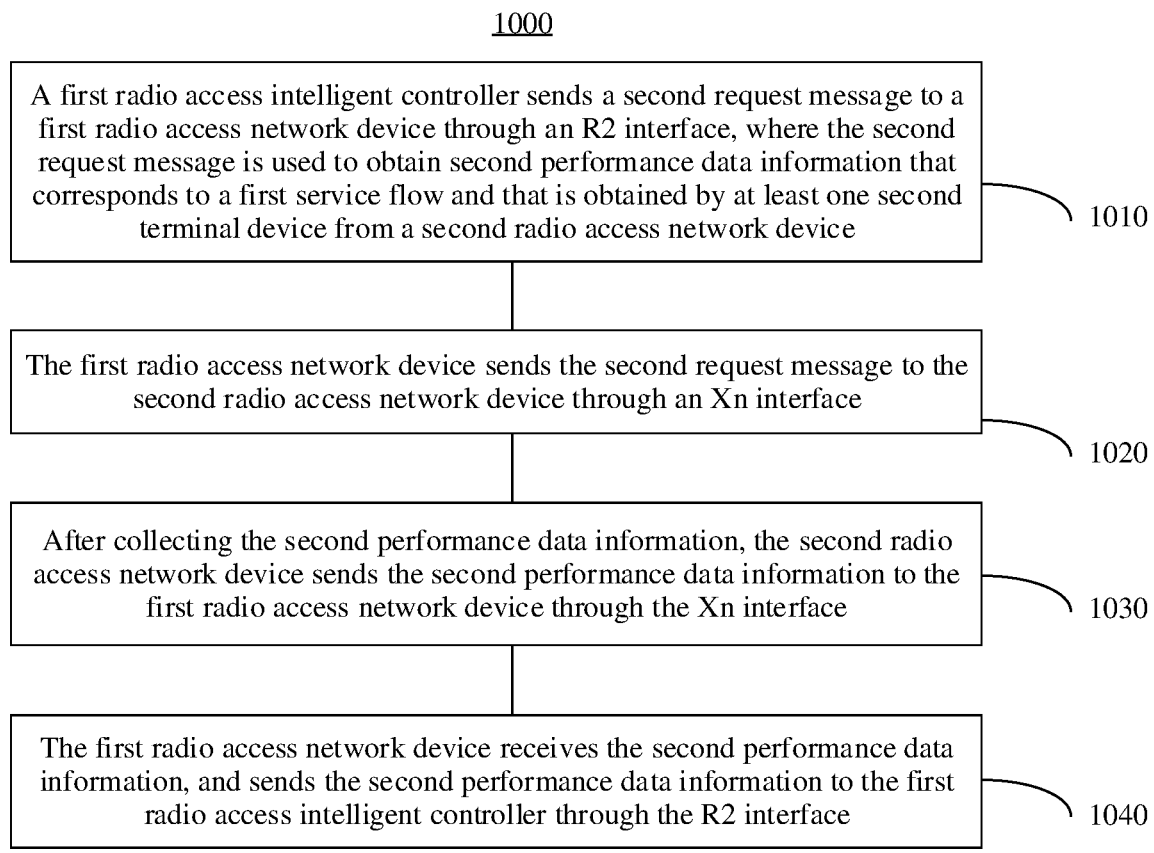
FIG. 10 is a schematic flowchart of another method for determining a target radio access network device according to an embodiment of the present disclosure.

An embodiment of the present disclosure provides another method for determining a target radio access network device. FIG. 10 is a schematic flowchart of another method 1000 for determining a target radio access network device.

1010: If an adjacent radio access network device of a first radio access network device is within coverage of another radio access intelligent controller, for example, the first radio access network device is within coverage of a first radio access intelligent controller, and a second radio access network device adjacent to the first radio access network device is within coverage of a second near radio access intelligent controller, the first radio access intelligent controller sends a second request message to the first radio access network device through an R2 interface, where the second request message is used to obtain second performance data information that corresponds to a first service flow and that is obtained by at least one second terminal device from the second radio access network device, and the second request message includes an identifier of the at least one second terminal device and a first identifier used to identify the first service flow.

1020: The first radio access network device sends the second request message to the second radio access network device through an Xn interface.

1030: After collecting the second performance data information that corresponds to the first service flow and that can be obtained by the second terminal device, the second radio access network device sends the second performance data information to the first radio access network device through the Xn interface.

1040: The first radio access network device receives the second performance data information, and sends the second performance data information to the first radio access intelligent controller through the R2 interface.

Figure 11:
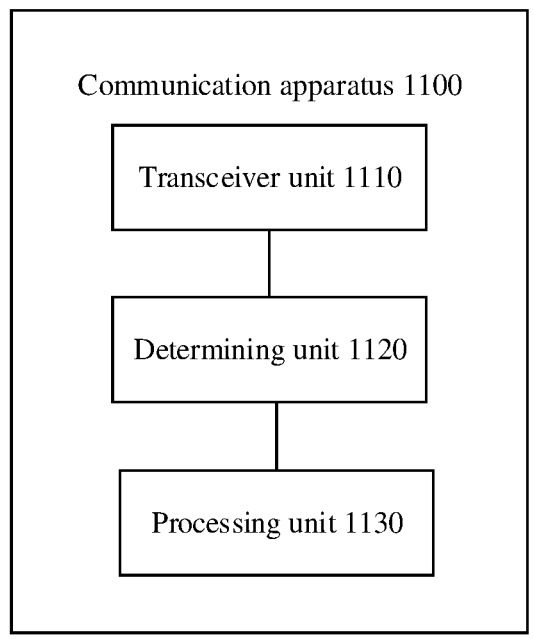
FIG. 11 is a schematic block diagram of a communication apparatus according to an embodiment of the present disclosure.

An embodiment of the present disclosure provides a communication apparatus. FIG. 11 is a schematic block diagram of the communication apparatus 1100 according to this embodiment. The apparatus may be used in the first network device in embodiments of the present disclosure. The communication apparatus 1200 includes:

a transceiver unit 1110, configured to obtain first quality of experience corresponding to a first service flow of at least one first terminal device;

a determining unit 1120, configured to determine at least one second terminal device in the at least one first terminal device based on the first quality of experience, where first quality of experience corresponding to a first service flow of the second terminal device does not meet target quality of experience corresponding to the first service flow of the second terminal device, where the determining unit 1120 is further configured to determine a target radio access network device, where the target radio access network device meets the target quality of experience corresponding to the first service flow of the at least one second terminal device; and a processing unit 1130, configured to connect the first service flow of the at least one second terminal device to the target radio access network device.

Optionally, the transceiver unit 1110 is further configured to send a first request message to a first radio access network device, where the first request message is used to subscribe to first performance data information corresponding to the first service flow of the at least one first terminal device, and the first request message includes an identifier of the at least one first terminal device and a first identifier corresponding to the first service flow.

The transceiver unit 1110 is further configured to receive a first response message sent by the first radio access network device, where the first response message includes the first performance data information.

The determining unit 1120 is specifically configured to determine the first quality of experience based on the first performance data information.

Optionally, the transceiver unit 1110 is further configured to send a second request message to the first radio access network device, where the second request message is used to obtain a plurality of pieces of second performance data information that correspond to the first service flow and that are obtained by the at least one second terminal device from a plurality of second radio access network devices, and the second request message includes an identifier of the at least one second terminal device and a first identifier.

The transceiver unit 1110 is further configured to receive a second response message sent by the first radio access network device, where the second response message includes the plurality of pieces of second performance data information.

The determining unit 1120 is specifically configured to determine, based on the plurality of pieces of second performance data information, a plurality of pieces of second quality of experience corresponding to the first service flow of the at least one second terminal device.

The determining unit 1120 is further specifically configured to determine the target radio access network device based on the plurality of pieces of second quality of experience, where second quality of experience that corresponds to the first service flow and that is obtained by the at least one second terminal device from the target radio access network device meets the target quality of experience.

Optionally, the processing unit 1130 is specifically configured to enable the transceiver unit 1110 to send traffic steering indication information to the first radio access network device, to enable the first radio access network device to connect the first service flow of the at least one second terminal device to the target radio access network device.

Optionally, the traffic steering indication information includes the identifier of the second terminal device, the first identifier, an identifier of the target radio access network device, and dual connectivity indication information, the dual connectivity indication information indicates to connect the first service flow of the second terminal device to the target radio access network device, and the second terminal device establishes connections to at least two radio access network devices.

Optionally, before the transceiver unit 1110 sends the traffic steering indication information to the first radio access network device, the determining unit 1120 is further configured to: determine that the at least one second terminal device supports dual connectivity.

Optionally, the transceiver unit is further configured to send a third request message to the first radio access network device, where the third request message is used to subscribe to capability information indicating whether the at least one second terminal device supports dual connectivity, and the third request message includes the identifier of the at least one second terminal device.

The transceiver unit is further configured to receive a third response message sent by the first radio access network device, where the third response message includes the capability information indicating whether the at least one second terminal device supports dual connectivity.

The determining unit is specifically configured to determine, based on the capability information, that the at least one second terminal device supports dual connectivity.

Optionally, before the transceiver unit obtains the first quality of experience corresponding to the first service flow of the at least one first terminal device, the determining unit is further configured to: determine, based on the first service flow, the first identifier corresponding to the first service flow, where the first identifier is used by the first radio access network device to identify the first service flow.

Optionally, the transceiver unit is further configured to receive a fourth message sent by a second network device, where the fourth message includes steering policy information corresponding to the first service flow, and the steering policy information includes the target quality of experience.

Optionally, the transceiver unit is further configured to send dual connectivity release indication information to the first radio access network device, where the dual connectivity release indication information indicates the first radio access network device to release a connection between the second terminal device and the target radio access network device after service data transmission corresponding to the first service flow is completed, and the dual connectivity release indication information includes the identifier of the second terminal device.

Optionally, the transceiver unit is further configured to send a fourth request message to the first radio access network device, where the fourth request message indicates the first radio access network device to send a service data transmission complete message after service data transmission corresponding to the first service flow is completed, the fourth request message includes the identifier of the at least one second terminal device and the first identifier, and the service data transmission complete message includes the identifier of the at least one second terminal device and the first identifier. The transceiver unit is further configured to receive the service data transmission complete message sent by the first radio access network device. The determining unit is further configured to determine, based on the service data transmission complete message, whether to release a connection between the second terminal device and the target radio access network device.

Optionally, if the determining unit determines, based on the service data transmission complete message, to release the connection between the second terminal device and the target radio access network device, the transceiver unit sends dual connectivity release indication information to the first radio access network device, where the dual connectivity release indication information includes the identifier of the second terminal device.

If the determining unit determines, based on the service data transmission complete message, not to release the connection between the second terminal device and the target radio access network device, the transceiver unit sends dual connectivity update indication information to the first radio access network device, where the dual connectivity update indication information indicates to connect a service flow of a second service type of the second terminal device to the target radio access network device, and the dual connectivity update indication information includes dual connectivity modification configuration information.

Optionally, the second network device may be a radio access management controller.

Figure 12:
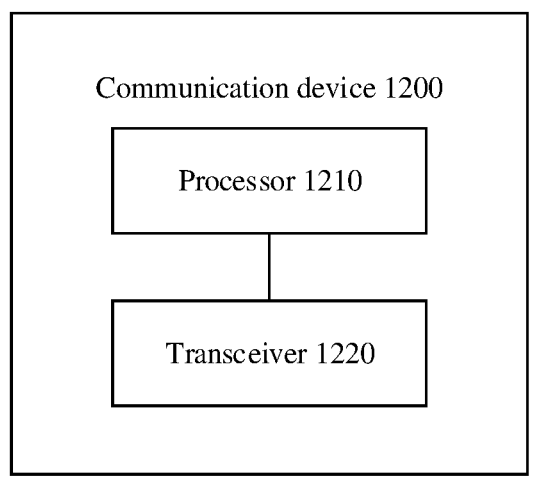
FIG. 12 is a schematic block diagram of a communication device according to an embodiment of the present disclosure.

An embodiment of the present disclosure provides a communication device 1200. FIG. 12 is a schematic block diagram of the communication device 1200 according to this embodiment.

The device 1200 includes a processor 1210 and a transceiver 1220. The transceiver 1220 is configured to: receive computer code or instructions, and transmit the computer code or the instructions to the processor 1210. The processor 1210 runs the computer code or the instructions, to implement the method in any possible implementation in embodiments of the present disclosure.

The processor 1210 may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of the present disclosure. The general-purpose processor may be a microprocessor, or the processor may be any conventional processor or the like. The steps of the methods disclosed with reference to embodiments of the present disclosure may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps of the foregoing methods in combination with hardware of the processor.

The foregoing memory may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be understood that the memory may be integrated into the processor, the processor and the memory may be integrated on a same chip, or the processor and the memory may be separately located on different chips and connected in an interface coupling manner. This is not limited in this embodiment.

When the communication device 1200 is a chip, the chip includes a transceiver unit and a processing unit. The transceiver unit may be an input/output circuit or a communication interface. The processing unit is a processor, a microprocessor, or an integrated circuit integrated on the chip.

An embodiment of the present disclosure provides a communication system. The system includes the first network device, the second network device, the first terminal device, the second terminal device, the first radio access network device, and the target radio access network device in the methods in embodiments of the present disclosure.

An embodiment of the present disclosure further provides a computer-readable storage medium. The computer-readable storage medium stores a computer program used to implement the methods in the foregoing method embodiments. When the computer program is run on a computer, the computer is enabled to implement the methods in the foregoing method embodiments.

In addition, the term "and/or" in the present disclosure merely indicates an association relationship for describing associated objects, and indicates that three relationships may exist. For example, A and/or B may indicate any one of the following three cases: Only A exists, both A and B exist, or only B exists. In addition, the character "/" in this specification generally indicates that the associated objects are in an "or" relationship. In the present disclosure, the term "at least one" may represent "one" and "two or more". For example, at least one of A, B, and C may represent the following seven cases: Only A exists, only B exists, only C exists, both A and B exist, both A and C exist, both C and B exist, A, B, and C all exist.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

A person skilled in the art may clearly learn that, for the purpose of convenient and brief description, for a specific working process of the foregoing system, apparatuses, and units, refer to a corresponding process in the foregoing method embodiments. Details are not described herein again.

In several embodiments provided in the present disclosure, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of the present disclosure. The storage medium includes any medium that can store program code, for example, a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A service traffic steering method, comprising:
    obtaining, by a first network device, first quality of experience corresponding to a first service flow of at least one first terminal device;
    determining, by the first network device, at least one second terminal device in the at least one first terminal device based on the first quality of experience, wherein first quality of experience corresponding to a first service flow of the at least one second terminal device does not meet target quality of experience corresponding to the first service flow of the at least one second terminal device;
    determining, by the first network device, a target radio access network device, wherein the target radio access network device meets the target quality of experience corresponding to the first service flow of the at least one second terminal device; and
    connecting, by the first network device, the first service flow of the at least one second terminal device to the target radio access network device.

2. The method according to claim 1, wherein the obtaining, by a first network device, first quality of experience corresponding to a first service flow of at least one first terminal device comprises:
    sending, by the first network device, a first request message to a first radio access network device, wherein the first request message is for subscribing to first performance data information corresponding to the first service flow of the at least one first terminal device, and the first request message comprises one or more identifiers of the at least one first terminal device and a first identifier corresponding to the first service flow;
    receiving, by the first network device, a first response message sent by the first radio access network device, wherein the first response message comprises the first performance data information; and
    determining, by the first network device, the first quality of experience based on the first performance data information.

3. The method according to claim 2, wherein the determining, by the first network device, a target radio access network device comprises:
    sending, by the first network device, a second request message to the first radio access network device, wherein the second request message is for obtaining a plurality of pieces of second performance data information that corresponds to the first service flow and that is obtained by the at least one second terminal device from a plurality of second radio access network devices, and the second request message comprises one or more identifiers of the at least one second terminal device and a first identifier;
    receiving, by the first network device, a second response message sent by the first radio access network device, wherein the second response message comprises the plurality of pieces of second performance data information;
    determining, by the first network device based on the plurality of pieces of second performance data information, a plurality of pieces of second quality of experience corresponding to the first service flow of the at least one second terminal device; and
    determining, by the first network device, the target radio access network device based on the plurality of pieces of second quality of experience, wherein second quality of experience that corresponds to the first service flow and that is obtained by the at least one second terminal device from the target radio access network device meets the target quality of experience.

4. The method according to claim 2, wherein the connecting, by the first network device, the first service flow of the at least one second terminal device to the target radio access network device comprises:
- sending, by the first network device, traffic steering indication information to the first radio access network device, to enable the first radio access network device to connect the first service flow of the at least one second terminal device to the target radio access network device.

5. The method according to claim 4, wherein the traffic steering indication information comprises one or more identifiers of the at least one second terminal device, the first identifier, an identifier of the target radio access network device, and dual connectivity indication information, the dual connectivity indication information indicates to connect the first service flow of the at least one second terminal device to the target radio access network device, and the at least one second terminal device establishes connections to at least two radio access network devices.

6. The method according to claim 4, wherein before the connecting, by the first network device, the first service flow of the at least one second terminal device to the target radio access network device, the method further comprises:
- determining, by the first network device, that the at least one second terminal device supports dual connectivity.

7. The method according to claim 6, wherein the determining, by the first network device, that the at least one second terminal device supports dual connectivity comprises:
- sending, by the first network device, a third request message to the first radio access network device, wherein the third request message is for subscribing to capability information indicating whether the at least one second terminal device supports dual connectivity, and the third request message comprises one or more identifiers of the at least one second terminal device;
- receiving, by the first network device, a third response message sent by the first radio access network device, wherein the third response message comprises the capability information indicating whether the at least one second terminal device supports dual connectivity; and
- determining, by the first network device based on the capability information, that the at least one second terminal device supports dual connectivity.

8. The method according to claim 2, wherein before the obtaining, by a first network device, first quality of experience corresponding to a first service flow of at least one first terminal device, the method further comprises:
- determining, by the first network device based on the first service flow, the first identifier corresponding to the first service flow, wherein the first radio access network device uses the first identifier to identify the first service flow.

9. The method according to claim 8, wherein before the determining, by the first network device based on the first service flow, the first identifier corresponding to the first service flow, the method further comprises:
- receiving, by the first network device, a fourth message sent by a second network device, wherein the fourth message comprises steering policy information corresponding to the first service flow, and the steering policy information comprises the target quality of experience.

10. The method according to claim 2, further comprising:
- sending, by the first network device, dual connectivity release indication information to the first radio access network device, wherein the dual connectivity release indication information indicates the first radio access network device to release a connection between the at least one second terminal device and the target radio access network device after service data transmission corresponding to the first service flow is completed, and the dual connectivity release indication information comprises one or more identifier of the at least one second terminal device.

11. The method according to claim 2, further comprising:
- sending, by the first network device, a fourth request message to the first radio access network device, wherein the fourth request message indicates the first radio access network device to send a service data transmission complete message after service data transmission corresponding to the first service flow is completed, the fourth request message comprises one or more identifiers of the at least one second terminal device and the first identifier, and the service data transmission complete message comprises one or more identifiers of the at least one second terminal device and the first identifier;
- receiving, by the first network device, the service data transmission complete message sent by the first radio access network device; and
- determining, by the first network device based on the service data transmission complete message, whether to release a connection between the at least one second terminal device and the target radio access network device.

12. The method according to claim 11, wherein the determining, by the first network device based on the service data transmission complete message, whether to release a connection between the at least one second terminal device and the target radio access network device comprises:
- when the first network device determines, based on the service data transmission complete message, to release the connection between the at least one second terminal device and the target radio access network device, sending dual connectivity release indication information to the first radio access network device, wherein the dual connectivity release indication information comprises the one or more identifiers of the at least one second terminal device.

13. The method according to claim 9, wherein the first network device is a radio access intelligent controller, and the second network device is a radio access management controller.

14. The method according to claim 11, wherein the determining, by the first network device based on the service data transmission complete message, whether to release a connection between the at least one second terminal device and the target radio access network device comprises:
- when the first network device determines, based on the service data transmission complete message, not to release the connection between the at least one second terminal device and the target radio access network device, sending dual connectivity update indication information to the first radio access network device, wherein the dual connectivity update indication information indicates to connect a service flow of a second service type of the at least one second terminal device to the target radio access network device, and the dual connectivity update indication information comprises dual connectivity modification configuration information.

15. A communication device, comprising at least one processor and a transceiver, wherein the transceiver is configured to: receive computer code or instructions, and transmit the computer code or the instructions to the at least one processor, and the at least one processor runs the computer code or the instructions, to perform operations comprising:

obtaining first quality of experience corresponding to a first service flow of at least one first terminal device;

determining at least one second terminal device in the at least one first terminal device based on the first quality of experience, wherein first quality of responding to a first service flow of the at least one second terminal device does et quality of experience corresponding to the first service at least one second terminal device;

determining a target radio access network device, wherein the target radio access network device meets the target quality of experience corresponding to the first service flow of the at least one second terminal device; and connecting the first service flow of the at least one second terminal device to the target radio access network device.

16. The communication device according to claim 15, wherein the operations further comprise:

sending a first request message to a first radio access network device, wherein the first request message is for subscribing to first performance data information corresponding to the first service flow of the at least one first terminal device, and the first request message comprises an identifier of the at least one first terminal device and a first identifier corresponding to the first service flow;

receiving a first response message sent by the first radio access network device, wherein the first response message comprises the first performance data information; and determining the first quality of experience based on the first performance data information.

17. The communication device according to claim 16, wherein the determining a target radio access network device comprises:

sending a second request message to the first radio access network device, wherein the second request message is for obtaining a plurality of pieces of second performance data information that corresponds to the first service flow and that is obtained by the at least one second terminal device from a plurality of second radio access network devices, and the second request message comprises an identifier of the at least one second terminal device and a first identifier;

receiving a second response message sent by the first radio access network device, wherein the second response message comprises the plurality of pieces of second performance data information;

determining, based on the plurality of pieces of second performance data information, a plurality of pieces of second quality of experience corresponding to the first service flow of the at least one second terminal device; and determining the target radio access network device based on the plurality of pieces of second quality of experience, wherein second quality of experience that corresponds to the first service flow and that is obtained by the at least one second terminal device from the target radio access network device meets the target quality of experience.

18. The communication device according to claim 16, wherein the connecting the first service flow of the at least one second terminal device to the target radio access network device comprises:

sending traffic steering indication information to the first radio access network device, to enable the first radio access network device to connect the first service flow of the at least one second terminal device to the target radio access network device.

19. The communication device according to claim 18, wherein the traffic steering indication information comprises one or more identifiers of the at least one second terminal device, the first identifier, an identifier of the target radio access network device, and dual connectivity indication information, the dual connectivity indication information indicates to connect the first service flow of the at least one second terminal device to the target radio access network device, and the at least one second terminal device establishes connections to at least two radio access network devices.

20. The communication device according to claim 18, wherein the operations further comprise:

before the connecting the first service flow of the at least one second terminal device to the target radio access network device, determining that the at least one second terminal device supports dual connectivity.

* * * * *

UNITED STATES PATENT AND TRADEMARK OFFICE
CERTIFICATE OF CORRECTION

| | |
|---|---|
| PATENT NO. | : 12,490,142 B2 |
| APPLICATION NO. | : 18/167187 |
| DATED | : December 2, 2025 |
| INVENTOR(S) | : Longyu Cao et al. |

Page 1 of 1

It is certified that error appears in the above-identified patent and that said Letters Patent is hereby corrected as shown below:

In the Claims

Column 32, Claim 10, Line 7, change "identifier" to --identifiers--;

Column 33, Claim 15, Line 9, change "responding" to --experience corresponding--;

Column 33, Claim 15, Line 11, change "does et" to --does not meet target--; and

Column 33, Claim 15, Line 12, change "first service" to --first service flow of the--.

Signed and Sealed this
Tenth Day of February, 2026

John A. Squires
*Director of the United States Patent and Trademark Office*